US012811343B2

(12) United States Patent
Tsunemura

(10) Patent No.: US 12,811,343 B2
(45) Date of Patent: Nov. 24, 2026

(54) CONNECTOR AND ELECTRONIC APPARATUS

(71) Applicant: KYOCERA CORPORATION, Kyoto (JP)

(72) Inventor: Akio Tsunemura, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 320 days.

(21) Appl. No.: 18/681,831

(22) PCT Filed: Aug. 3, 2022

(86) PCT No.: PCT/JP2022/029852
§ 371 (c)(1),
(2) Date: Feb. 6, 2024

(87) PCT Pub. No.: WO2023/017766
PCT Pub. Date: Feb. 16, 2023

(65) Prior Publication Data

US 2025/0141155 A1 May 1, 2025

(30) Foreign Application Priority Data

Aug. 10, 2021 (JP) ................................ 2021-130985

(51) Int. Cl.
*H01R 13/639* (2006.01)
*H01R 12/71* (2011.01)
*H01R 13/405* (2006.01)

(52) U.S. Cl.
CPC ......... *H01R 13/639* (2013.01); *H01R 12/716* (2013.01); *H01R 13/405* (2013.01)

(58) Field of Classification Search
CPC .. H01R 13/639; H01R 13/405; H01R 12/716; H01R 12/52
USPC ...................................................... 439/65, 74
See application file for complete search history.

(56) References Cited

U.S. PATENT DOCUMENTS 8,845,339 B2 * 9/2014 Ono ...................... H01R 12/73 439/74
9,039,428 B2 * 5/2015 Sasaki ................. H01R 13/631 439/74
9,985,366 B2 * 5/2018 Takeuchi ............... H01R 13/00
10,249,969 B2 4/2019 Ono
(Continued)

FOREIGN PATENT DOCUMENTS

JP 2019140095 A 8/2019
JP 2020074338 A 5/2020
(Continued)

*Primary Examiner* — Gary F Paumen
(74) *Attorney, Agent, or Firm* — Duane Morris LLP

(57) ABSTRACT

According to the present disclosure, a connector (10) configured to engage a connection object (50) includes contacts (30), an insulator (20), and a second metal fitting (**40*b*). The insulator (20) includes an outer wall (23) to which the contacts (30) are attached. The outer wall (23) extends in a longitudinal direction of the connector (10). The second metal fitting (40*b*) is attached to a longitudinal-end portion (E) of the outer wall (23). The second metal fitting (40*b*) includes a peripheral portion (40*b*1) that serves as a periphery of the connector (10) in a region (R) located at a longitudinal end of the connector (10) and located longitudinally outside of the longitudinal-end portion (E) of the outer wall (23**).

13 Claims, 13 Drawing Sheets

(56) References Cited

U.S. PATENT DOCUMENTS

| | | | | |
|---|---|---|---|---|
| 10,403,991 | B2 * | 9/2019 | Takeuchi | H01R 13/6275 |
| 10,530,079 | B2 * | 1/2020 | Takeuchi | H01R 13/6275 |
| 10,651,579 | B2 | 5/2020 | Ono | |
| 10,756,466 | B2 | 8/2020 | Ono | |
| 10,910,779 | B2 * | 2/2021 | Amemori | H01R 13/6592 |
| 12,142,860 | B2 | 11/2024 | Horino et al. | |
| 2015/0079816 | A1 * | 3/2015 | Suzuki | H01R 13/6275 439/74 |
| 2015/0140844 | A1 * | 5/2015 | Decker | H01R 4/34 439/152 |
| 2015/0207248 | A1 * | 7/2015 | Takenaga | H01R 12/716 439/74 |

FOREIGN PATENT DOCUMENTS

| | | | |
|---|---|---|---|
| JP | 2021103667 | A | 7/2021 |
| KR | 20180123980 | A | 11/2018 |

* cited by examiner

CONNECTOR AND ELECTRONIC APPARATUS

CROSS-REFERENCE TO RELATED APPLICATIONS

This application claims the benefit of Japanese Patent Application No. 2021-130985 filed Aug. 10, 2021, which is hereby incorporated by reference herein in its entirety.

TECHNICAL FIELD

The present disclosure relates to a connector and an electronic apparatus.

BACKGROUND OF INVENTION

An art of a connector module that includes a connector and a connection object is known widely. The connector and the connection object are mounted on different circuit substrates, and the connector module electrically connects the different circuit substrates to each other. For example, Patent Literature 1 discloses a connector that includes a reinforcing metal fitting, and the reinforcing metal fitting does not deform during engagement or disengagement between the connector and the connection object, thereby improving the reliability of the connector.

CITATION LIST

Patent Literature

Patent Literature 1: Japanese Unexamined Patent Application Publication No. 2020-74338

SUMMARY

According to an embodiment of the present disclosure, a connector configured to engage a connection object includes contacts, an insulator, and a second metal fitting. The insulator includes an outer wall to which the contacts are attached. The outer wall extends in a longitudinal direction of the connector. The second metal fitting is attached to a longitudinal-end portion of the outer wall. The second metal fitting includes a peripheral portion that serves as a periphery of the connector in a region located at a longitudinal end of the connector and located longitudinally outside of the longitudinal-end portion of the outer wall.

An electronic apparatus according to an embodiment of the present disclosure includes the above connector.

DESCRIPTION OF EMBODIMENTS

Figure 1:
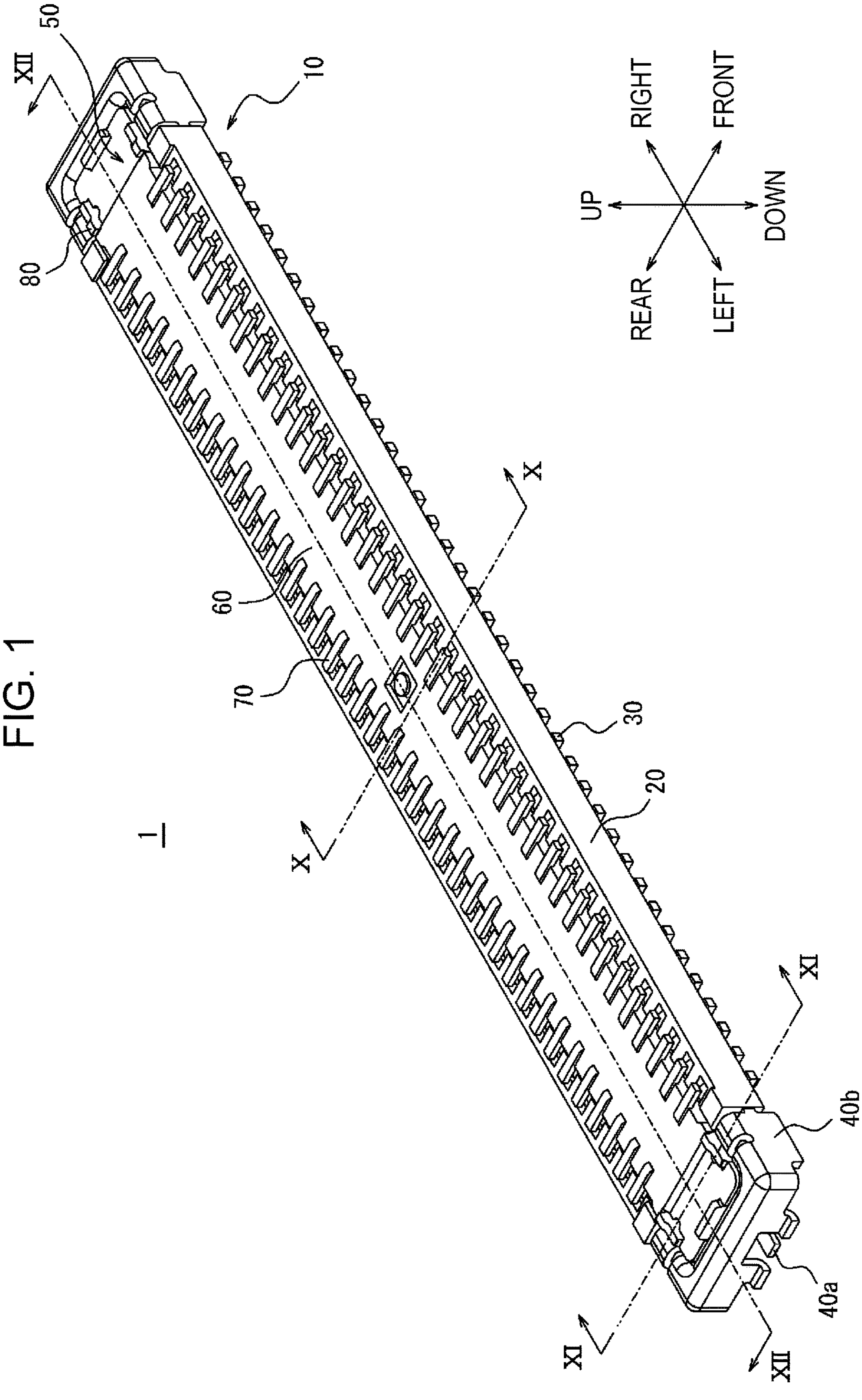
FIG. 1 is a perspective view, as viewed from above, illustrating the exterior of a connector module according to an embodiment, in which a connector and a connection object are connected to each other.

Connectors are subjected to size and height reduction, which increases the likelihood of a connector having a problem, such as wear and tear of an insulator of the connector, due to a connection object or a metal fitting hitting the insulator during the engagement between the connector and the connection object or while the metal fitting is mounted on the connector. If the insulator is abraded by the connection object or the metal fitting or the like, fragments of the insulator may adhere to contacts of the connector, which may lead to poor connection. This deteriorates the product reliability of the connector. The abrasion of the insulator may lead to malfunction of the connector.

According to a connector and an electronic apparatus of an embodiment of the present disclosure, the occurrence of the above malfunction of the connector caused by the insulator can be reduced even if the size and height of the connector are reduced.

The following describes an embodiment of the present disclosure in detail with reference to the drawings. In the following description, the front-rear direction, the right-left direction, and the up-down direction are defined with reference to the directions of arrows in the drawings. The directions of the arrows in FIGS. 1 to 8 and in FIGS. 10 to 13 are aligned with corresponding arrows in different figures. In some drawings, illustration of circuit substrates CB1 and CB2 (to be described later) is omitted for the purpose of easy understanding.

Figure 2:
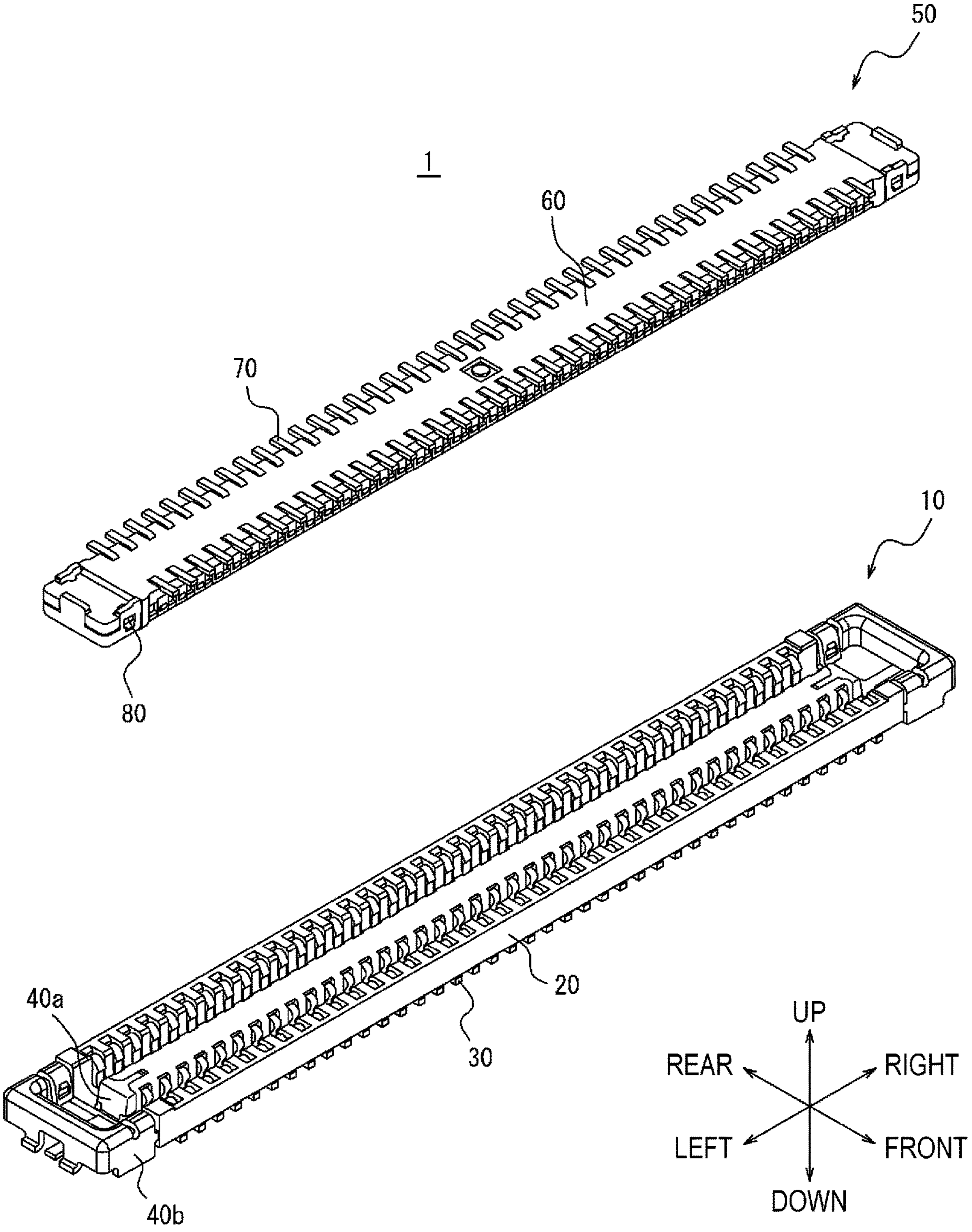
FIG. 2 is a perspective view, as viewed from above, illustrating the exterior of the connector module according to the embodiment, in which the connector and the connection object are separated from each other.

FIG. 1 is a perspective view, as viewed from above, illustrating the exterior of a connector module 1 according to an embodiment, in which a connector 10 and a connection object 50 are connected to each other. FIG. 2 is a perspective view, as viewed from above, illustrating the exterior of the connector module 1 according to the embodiment, in which the connector 10 and the connection object 50 are separated from each other.

For example, as illustrated in FIG. 2, the connector module 1 includes the connector 10 and the connection object 50 that are configured to be connected to each other. The connector 10 includes a first insulator 20 and first contacts 30 attached to the first insulator 20. The connector 10 also includes first metal fittings 40*a* and second metal fittings 40*b*, and these fittings are attached to the first insulator 20.

The connection object 50 is connectable to the connector 10. The connection object 50 includes a second insulator 60. The second insulator 60 engages the first insulator 20 in a connection state in which the connector 10 and the connection object 50 are connected to each other. The connection object 50 also includes second contacts 70 attached to the second insulator 60. The second contacts 70 are in contact with respective first contacts 30 in an engagement state in which the first insulator 20 engages the second insulator 60. The connection object 50 further includes metal fittings 80 attached to the second insulator 60. Each metal fitting 80 is in contact with a second metal fitting 40*b* in the engagement state. This causes the second metal fitting 40*b* to deform elastically.

In the following description, the connector 10 of the embodiment is assumed to be a receptacle connector by way of example. The connection object 50 is assumed to be a plug connector by way of example. In the engagement state in which the first insulator 20 and the second insulator 60 engage each other, the connector 10 in which the first contacts 30 are deformed elastically is assumed to be the receptacle connector, and the connection object 50 in which the second contacts 70 are not deformed elastically is assumed to be the plug connector. The types of the connector 10 and the connection object 50 are not limited to those described above. For example, the connector 10 may serve as the plug connector, while the connection object 50 may serve as the receptacle connector.

The connection object 50 is not limited to the above but can be a connection object other than the plug connector or the receptacle connector. For example, the connection object 50 can be a flexible printed circuit board (FPC), a flexible flat cable, a rigid board, or a card edge connector of an arbitrary circuit substrate.

In the following description, the connector 10 and the connection object 50 are assumedly mounted on circuit substrates CB1 and CB2, respectively. The circuit substrate CB1 and the circuit substrate CB2 are electrically coupled to each other in the connection state in which the connector 10 and the connection object 50 are connected to each other. The circuit substrates CB1 and CB2 may be rigid substrates or may be any arbitrary circuit substrates other than the rigid substrates. For example, at least one of the circuit substrates CB1 and CB2 may be the FPC.

In the following description, the connector 10 and the connection object 50 are assumedly connected to each other in a direction normal to the circuit substrates CB1 and CB2. The connector 10 and the connection object 50 are connected to each other, for example, in the up-down direction. The direction of connection is not limited to the up-down direction. The connector 10 and the connection object 50 may be connected to each other in a direction parallel to the circuit substrates CB1 and CB2. The connector 10 and the connection object 50 may be connected to each other in such a manner that one of the connector 10 and the connection object 50 is mounted vertically onto a circuit substrate and the other is mounted horizontally onto the other circuit substrate.

For example, in the present disclosure, the term "longitudinal direction" corresponds to the right-left direction. For example, the term "transverse direction" corresponds to the front-rear direction. For example, the term "engaging direction" corresponds to the up-down direction. For example, the term "direction orthogonal to the engaging direction" corresponds to the front-rear direction. For example, the term "engagement side" corresponds to an upper side. For example, the term "side opposite to the engagement side" corresponds to a lower side. For example, the term "surface facing the circuit substrate CB1" corresponds to a surface facing downward. For example, the term "first face" corresponds to a surface facing upward. For example, the term "second face" corresponds to a surface facing rearward. For example, the term "third face" corresponds to a surface facing frontward. For example, the term "fourth face" corresponds to a surface facing rightward or leftward. For example, the term "first flat surface" corresponds to a surface facing upward. For example, the term "second flat surface" corresponds to a surface facing rearward. For example, the term "third flat surface" corresponds to a surface facing frontward. For example, the term "fourth flat surface" corresponds to a side surface facing rightward or leftward.

Figure 3:
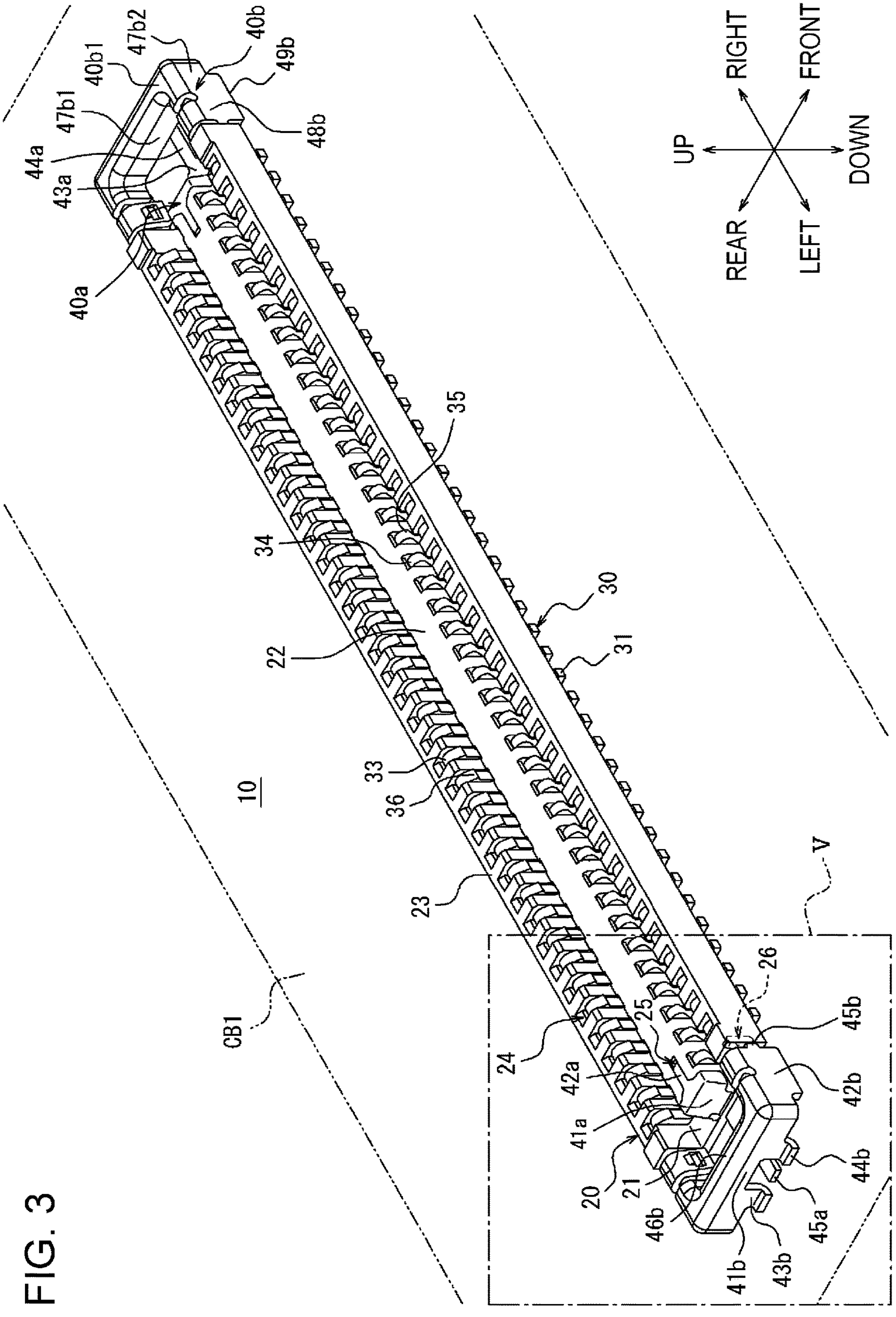
FIG. 3 is a perspective view, as viewed from above, illustrating the exterior of the connector of FIG. 1.

FIG. 3 is a perspective view, as viewed from above, illustrating the exterior of the connector 10 of FIG. 1. For example, the connector 10 can be obtained in the following manner: the first insulator 20 is formed integrally with the first metal fittings 40*a* and the second metal fittings 40*b* using insert molding, and the first contacts 30 are press-fitted into the first insulator 20.

Figure 4:
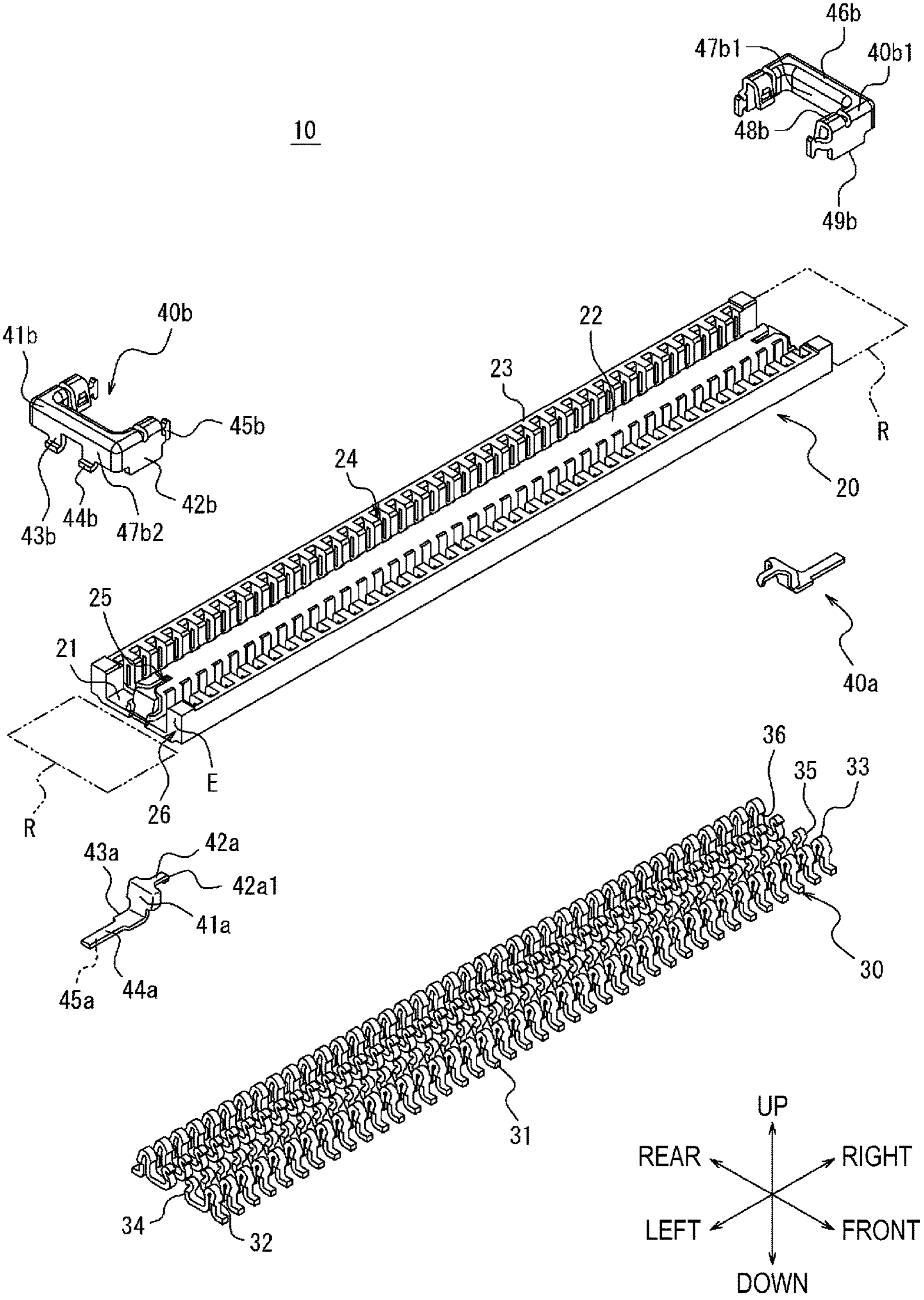
FIG. 4 is an exploded perspective view, as viewed from above, illustrating the exterior of the connector of FIG. 3.

FIG. 4 is an exploded perspective view, as viewed from above, illustrating the exterior of the connector 10 of FIG. 3. In reality, the first metal fittings 40*a*, the second metal fittings 40*b*, and the first insulator 20 are formed integrally using insert molding. In FIG. 4, however, the first metal fittings 40*a*, the second metal fittings 40*b*, and the first insulator 20 are illustrated separately for the purpose of easy understanding.

The first insulator 20 of the connector 10 is made of a synthetic resin having insulating and heat-resisting properties. The first insulator 20 is shaped like a plate elongated in the right-left direction. The first insulator 20 includes a bottom plate 21 that constitutes the bottom part of the first insulator 20. The bottom plate 21 extends from outer walls 23 (to be described later) in a direction orthogonal to the engaging direction of the connector 10 and the connection object 50. The first insulator 20 includes an engagement projection 22 that projects toward an engagement side, where the connector 10 engages the connection object 50, from a central region of the bottom plate 21, the central region being located at the center in the front-rear and right-left directions. The first insulator 20 includes a pair of outer walls 23 that are spaced from each other in the transverse direction of the connector 10. The engagement projection 22 is interposed between the outer walls 23 in the transverse direction. The outer walls 23 protrude from the bottom plate 21 toward the engagement side where the connector 10 engages the connection object 50. The outer walls 23 are positioned with the engagement projection 22 being interposed therebetween in the front-rear direction. The outer walls 23 are elongated in the longitudinal direction of the connector 10.

The first insulator 20 includes first-contact mounting grooves 24. Each first-contact mounting groove 24 is formed continuously in the front-rear direction along an inside surface of an outer wall 23, the bottom plate 21, and an inside surface of the engagement projection 22. A first contact 30 is mounted in each first-contact mounting groove 24. Multiple first-contact mounting grooves 24 are formed, and the number of the first-contact mounting grooves 24 corresponds to the number of the first contacts 30. The first-contact mounting grooves 24 are arranged in the arrangement direction of the first contacts 30.

Figure 5:
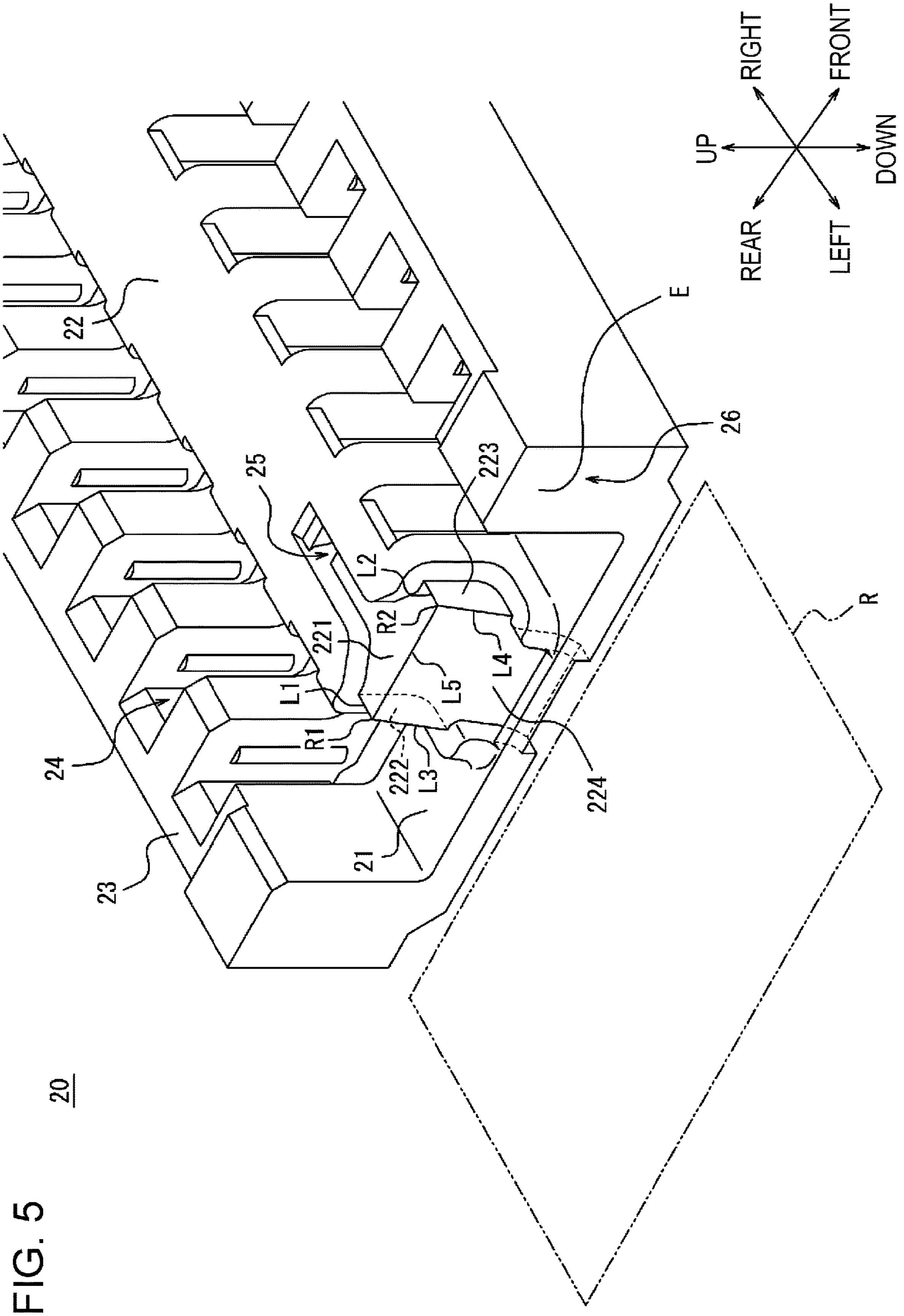
FIG. 5 is an enlarged view illustrating a region V surrounded by the dash-dot line in FIG. 3, in which a first insulator only is illustrated.

The first insulator 20 includes first-metal-fitting holding portions 25 that are positioned at respective ends of the engagement projection 22 in the right-left direction. As illustrated in FIG. 5, which is described later again, each first-metal-fitting holding portion 25 is recessed in an end portion of the engagement projection 22, the end portion being positioned in the right-left direction. A first metal fitting 40*a* is attached to each first-metal-fitting holding portion 25. The first insulator 20 includes second-metal-fitting holding portions 26 positioned at respective end portions E of the outer walls 23 in the longitudinal direction of the connector 10. A second metal fitting 40*b* is attached to each second-metal-fitting holding portion 26. In FIG. 5, the end portions E of respective outer walls 23 at each longitudinal end of the connector 10 are illustrated so as to have flat surfaces. In reality, however, installation portions 45*b* of each second metal fitting 40*b* are embedded integrally into the corresponding end portions E using insert molding.

The first insulator 20 does not include any element in a region R that is located at each longitudinal end of the connector 10 and also located outside the end portions E of the outer walls 23 in the longitudinal direction. The bottom plate 21, the engagement projection 22, and the outer walls 23 extend so as to reach each longitudinal end of the connector 10. In other words, the first insulator 20 is not present outside the longitudinal end nor in the region R.

FIG. 5 is an enlarged view illustrating a region V surrounded by the dash-dot line in FIG. 3, in which the first insulator 20 only is illustrated. Referring to FIG. 5, the structure of the engagement projection 22 at the first-metal-fitting holding portion 25 of the first insulator 20 is described in detail.

As illustrated in FIG. 5, the engagement projection 22 of the first insulator 20 has a first face 221. The first face 221 is an end surface facing the engagement side and positioned in each first-metal-fitting holding portion 25. The engagement projection 22 has a second face 222 that extends toward a side opposite to the engagement side from the rear edge of the first face 221, the rear edge extending in the longitudinal direction of the connector 10. The engagement projection 22 has a third face 223 that extends toward the side opposite to the engagement side from the front edge of the first face 221, the front edge extending in the longitudinal direction of the connector 10. The engagement projection 22 has a fourth face 224 that extends toward the side opposite to the engagement side from an edge of the first face 221, the edge being positioned at the end of the engagement projection 22 in the right-left direction and extending in the transverse direction of the connector 10. The first face 221, the second face 222, the third face 223, and the fourth face 224 are flat surfaces.

The engagement projection 22 includes a first intersection portion R1 at which the first face 221, the second face 222, and the fourth face 224 intersect each other. The first intersection portion R1 is positioned at the rear corner of the engagement projection 22. The first intersection portion R1 includes the intersection of three planes, in other words, the first face 221, the second face 222, and the fourth face 224, and also includes the vicinity of the intersection extending in the first face 221, the second face 222, and the fourth face 224.

The engagement projection 22 includes a second intersection portion R2 at which the first face 221, the third face 223, and the fourth face 224 intersect each other. The second intersection portion R2 is positioned at the front corner of the engagement projection 22. The second intersection portion R2 includes the intersection of three planes, in other words, the first face 221, the third face 223, and the fourth face 224, and also includes the vicinity of the intersection extending in the first face 221, the third face 223, and the fourth face 224.

The engagement projection 22 has a first intersection line L1 between the first face 221 and the second face 222. The engagement projection 22 has a second intersection line L2 between the first face 221 and the third face 223. The engagement projection 22 has a third intersection line L3 between the second face 222 and the fourth face 224. The engagement projection 22 has a fourth intersection line L4 between the third face 223 and the fourth face 224. The engagement projection 22 has a fifth intersection line L5 between the first face 221 and the fourth face 224. The first intersection line L1, the second intersection line L2, the third intersection line L3, the fourth intersection line L4, and the fifth intersection line L5 are straight lines.

Each first contact 30 is made, for example, of a thin plate that has spring elasticity and is made of a copper alloy, such as phosphor bronze, beryllium copper, or copper-titanium alloy, or of a Corson system copper alloy. The first contact 30 is formed of the thin plate using progressive metal forming (stamping) so as to have a shape illustrated in FIG. 4. The surface of the first contact 30 is plated with nickel to form a foundation layer and further plated with gold or tin thereover.

The first contact 30 includes a mount portion 31 that is an L-shaped protrusion protruding outward in the front-rear direction. The first contact 30 also includes a locking portion 32 that extends upward from the top end of the mount portion 31. The locking portion 32 is formed so as to be wider in the right-left direction than the mount portion 31. The first contact 30 includes a curved portion 33 shaped like the letter U. The curved portion 33 protrudes upward from the locking portion 32.

The first contact 30 includes an elastic contact arm 34 that adjoins the curved portion 33 and is shaped like the letter S. The first contact 30 includes an elastic contact point 35. The elastic contact point 35 is formed at the bent end portion of the elastic contact arm 34. The elastic contact point 35 faces outward in the front-rear direction. The first contact 30 also includes a contact point 36 formed at the curved portion 33. The contact point 36 protrudes so as to oppose the elastic contact point 35 in the front-rear direction.

Each first metal fitting 40*a* is formed of a thin plate of an arbitrary metal so as to have a shape illustrated in FIG. 4 using progressive metal forming (stamping). The first metal fitting 40*a* as a whole has a crank-like shape. More specifically, the first metal fitting 40*a* includes a hook portion 42*a*, a first base portion 41*a*, and a second base portion 43*a* (to be described later), and these portions integrally form the crank-like shape as a whole. The first base portion 41*a* and the second base portion 43*a* integrally form the crank-like shape as a whole. The first metal fitting 40*a* is formed in a manufacturing step including drawing in such a manner that the surfaces of a first base portion 41*a* that face upward or in the front-rear or right-left direction can be connected together seamlessly. The method of forming the first metal fitting 40*a* is not limited to this but may include, for example, a step of bending in the thickness direction in addition to, or in place of, the step including drawing.

The first metal fitting 40*a* includes the first base portion 41*a*. The first base portion 41*a* extends upward while inclining inward in the right-left direction. The first base portion 41*a* is subsequently bent at the top end thereof and extend further toward one side in the right-left direction. The first base portion 41*a* connects the second base portion 43*a* and the hook portion 42*a* (to be described later) together.

The first metal fitting 40*a* includes the hook portion 42*a*. The first base portion 41*a* has the portion that extends toward the above-described one side in the right-left direction, and the hook portion 42*a* extends further toward the one side from the portion of the first base portion 41*a*. The hook portion 42*a* is shaped like the letter L. The hook portion 42*a* has a tip end 42*a*1, and the tip end 42*a*1 is, for example, bent downward from an end of the hook portion 42*a*, the end facing the one side. The width of the hook portion 42*a* in the front-rear direction is smaller than the width of any other portion of the first metal fitting 40*a*. In other words, the width of the hook portion 42*a* in the front-rear direction is smaller, for example, than the width of the first base portion 41*a* that adjoins the hook portion 42*a*. The width of the hook portion 42*a* in the front-rear direction is smaller, for example, than the width of the second base portion 43*a* or the width of a narrow portion 44*a* (to be described later).

The first metal fitting 40*a* includes the second base portion 43*a* that extends straight toward the other side in the right-left direction from the bottom end of the first base portion 41*a*. In the front-rear direction, the width of the second base portion 43*a* is smaller than the width of the first base portion 41*a* that adjoins the second base portion 43*a*.

Figure 6:
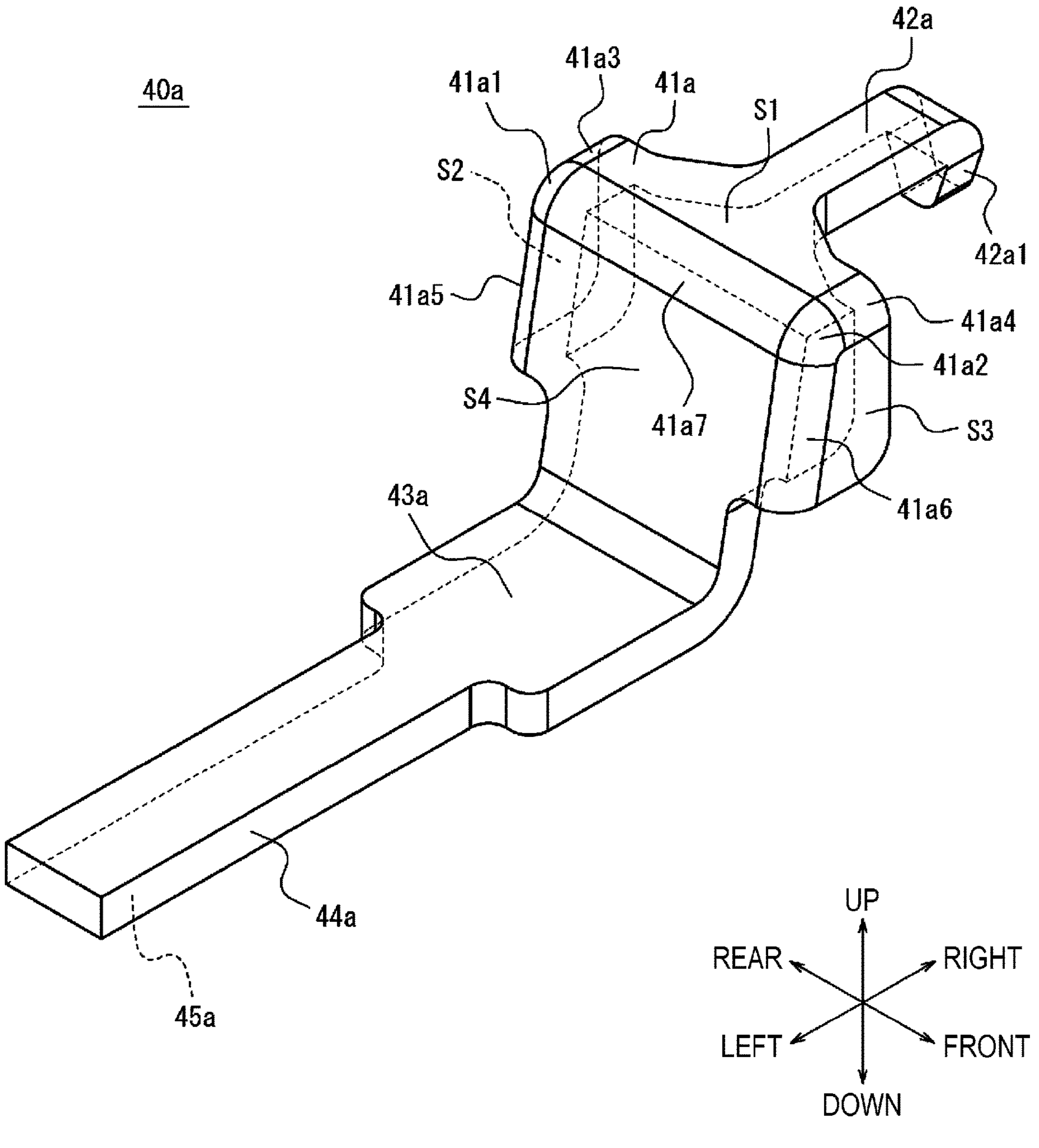
FIG. 6 is an enlarged view illustrating the region V surrounded by the dash-dot line in FIG. 3, in which a first metal fitting only is illustrated.

The first metal fitting 40*a* includes a narrow portion 44*a* in the second base portion 43*a*. The narrow portion 44*a* is shaped so as to be narrower than any other portion of the second base portion 43*a* in the front-rear direction. The narrow portion 44*a*, which is part of the second base portion 43*a*, extends outward in the right-left direction from a portion of the second base portion 43*a* adjoining the first base portion 41*a*. As illustrated in FIG. 6 (to be described later), the first metal fitting 40*a* includes a mount portion 45*a*. The mount portion 45*a* includes a bottom surface of a longitudinal end portion of the narrow portion 44*a* of the second base portion 43*a*, the bottom surface facing the circuit substrate CB1. The mount portion 45*a*, however, is not limited to this. In addition to the bottom surface of the narrow portion 44*a*, the mount portion 45*a* may further include the side surfaces of the narrow portion 44*a*, the side surfaces extending in the up-down direction, and the top surface of the narrow portion 44*a*.

FIG. 6 is an enlarged view illustrating the region V surrounded by the dash-dot line in FIG. 3, in which the first metal fitting 40*a* only is illustrated. Referring to FIG. 6, the structure of the first base portion 41*a* of the first metal fitting 40*a* is described in detail in relation to corresponding portions of the engagement projection 22 in FIG. 5.

The first metal fitting 40*a* includes a first end portion 41*a*1. The first end portion 41*a*1 is disposed at the first intersection portion R1 of the engagement projection 22, at which the first face 221, the second face 222, and the fourth face 224 intersect, so as to cover part of the first face 221, part of the second face 222, and part of the fourth face 224. The first end portion 41*a*1 is a rear corner portion of the first base portion 41*a* and has a round shape as a whole. The first end portion 41*a*1 is an upper-rear corner portion of the first metal fitting 40*a*.

The first metal fitting 40*a* includes a second end portion 41*a*2. The second end portion 41*a*2 is disposed at the second intersection portion R2 of the engagement projection 22, at which the first face 221, the third face 223, and the fourth face 224 intersect, so as to cover part of the first face 221, part of the third face 223, and part of the fourth face 224. The second end portion 41*a*2 is a front corner portion of the first base portion 41*a* and has a round shape as a whole. The second end portion 41*a*2 is an upper-front corner portion of the first metal fitting 40*a*.

The first metal fitting 40*a* includes a first projected portion 41*a*3. The first projected portion 41*a*3 is a boundary region that extends in the longitudinal direction from the first end portion 41*a*1 along the first intersection line L1 between the first face 221 and the second face 222. The first projected portion 41*a*3 is formed so as to have a cross section shaped like the letter L as viewed in the right-left direction. The first projected portion 41*a*3 is a bent portion formed from the top surface to the rear surface of the first base portion 41*a*.

The first metal fitting 40*a* includes a second projected portion 41*a*4. The second projected portion 41*a*4 is a boundary region that extends in the longitudinal direction from the second end portion 41*a*2 along the second intersection line L2 between the first face 221 and the third face 223. The second projected portion 41*a*4 is formed so as to have a cross section shaped like the letter L as viewed in the right-left direction. The second projected portion 41*a*4 is a bent portion formed from the top surface to the front surface of the first base portion 41*a*.

The first metal fitting 40*a* includes a third projected portion 41*a*5. The third projected portion 41*a*5 is a boundary region that extends from the first end portion 41*a*1 toward the side opposite to the engagement side along the third intersection line L3 between the second face 222 and the fourth face 224. The third projected portion 41*a*5 is formed so as to have a cross section shaped like the letter L as viewed from above. The third projected portion 41*a*5 is a bent portion formed from the side surface facing in the right-left direction to the rear surface of the first base portion 41*a*.

The first metal fitting 40*a* includes a fourth projected portion 41*a*6. The fourth projected portion 41*a*6 is a boundary region that extends from the second end portion 41*a*2 toward the side opposite to the engagement side along the fourth intersection line L4 between the third face 223 and the fourth face 224. The fourth projected portion 41*a*6 is formed so as to have a cross section shaped like the letter L as viewed from above. The fourth projected portion 41*a*6 is a bent portion formed from the side surface facing in the right-left direction to the front surface of the first base portion 41*a*.

The first metal fitting 40*a* includes a fifth projected portion 41*a*7. The fifth projected portion 41*a*7 is a boundary region that extends between the first end portion 41*a*1 and the second end portion 41*a*2 along the fifth intersection line L5 between the first face 221 and the fourth face 224. The fifth projected portion 41*a*7 is formed so as to have a cross section shaped like the letter L as viewed in the front-rear direction. The fifth projected portion 41*a*7 is a bent portion formed from the top surface of the first base portion 41*a* to the side surface facing in the right-left direction.

The first metal fitting 40*a* has a first flat surface S1 disposed along the first face 221, a second flat surface S2 disposed along the second face 222, a third flat surface S3 disposed along the third face 223, and a fourth flat surface S4 disposed along the fourth face 224.

The first flat surface S1 is the top surface of the first metal fitting 40*a*. The first flat surface S1 adjoins the front edge of the first projected portion 41*a*3, the edge of the fifth projected portion 41*a*7 positioned in the right-left direction, and the rear edge of the second projected portion 41*a*4. The second flat surface S2 is the rear surface of the first metal fitting 40*a*. The second flat surface S2 adjoins the lower edge of the first projected portion 41a3 and the edge of the third projected portion 41a5 positioned in the right-left direction.

The third flat surface S3 is the front surface of the first metal fitting 40a. The third flat surface S3 adjoins the lower edge of the second projected portion 41a4 and the edge of the fourth projected portion 41a6 positioned in the right-left direction. The fourth flat surface S4 is the side surface of the first metal fitting 40a facing in the right-left direction. The fourth flat surface S4 adjoins the front edge of the third projected portion 41a5, the lower edge of the fifth projected portion 41a7, and the rear edge of the fourth projected portion 41a6.

In the longitudinal end portion of the engagement projection 22, the first metal fitting 40a seamlessly covers the first face 221, the second face 222, the third face 223, the fourth face 224, and all the intersection lines therebetween, with surfaces of the first metal fitting 40a, the surfaces orthogonally intersecting the thickness direction of the first metal fitting 40a. The first base portion 41a of the first metal fitting 40a is shaped such that the first flat surface S1, the second flat surface S2, the third flat surface S3, and the fourth flat surface S4 are connected together seamlessly and smoothly by the end portions and the projected portions. The first metal fitting 40a having such a shape can be formed by drawing.

Each second metal fitting 40b is formed of a thin plate of an arbitrary metal so as to have a shape illustrated in FIG. 4 using progressive metal forming (stamping). The second metal fitting 40b is formed in a manufacturing step including drawing in such a manner that an outer peripheral surface 47b2, an inner peripheral surface 47b1, and a top surface of the second metal fitting 40b (which are described later) are connected to each other and extend seamlessly in the front-rear and right-left directions. The method of forming the second metal fitting 40b is not limited to this but may include, for example, a step of bending in the thickness direction in addition to, or in place of, the step including drawing.

The second metal fitting 40b includes a first base portion 41b that extends in the front-rear direction. The second metal fitting 40b also includes second base portions 42b that protrude toward the above-described one side in the right-left direction from respective opposite ends of the first base portion 41b in the front-rear direction. The first base portion 41b and the second base portions 42b are included in a peripheral portion 40b1. The peripheral portion 40b1 extends in the front-rear and right-left directions and constitutes part of the outer periphery of the second metal fitting 40b.

The second metal fitting 40b includes protruding portions 43b that protrude straight downward from respective front and rear portions of the first base portion 41b. A lower part of each protruding portion 43b is projected outward in the right-left direction. A pair of the protruding portions 43b, which are spaced in the front-rear direction, have respective edges that oppose each other. These edges of the protruding portions 43b and a lower edge of the first base portion 41b form a recess. The second metal fitting 40b includes first mount portions 44b positioned at the bottom ends of respective protruding portions 43b.

The second metal fitting 40b includes a pair of installation portions 45b. The installation portions 45b are positioned at respective ends of the second base portions 42b, the respective ends facing the one side in the right-left direction. The installation portions 45b are spaced from each other in the transverse direction of the connector 10. The installation portions 45b protrude further toward the one side in the right-left direction from the ends of respective second base portions 42b, the ends facing the one side in the right-left direction. Each installation portion 45b extends in the right-left direction and has a crank-like bent portion being bent inward in the front-rear direction. An end portion of the installation portion 45b facing the one side in the right-left direction is shaped so as to be wider in the up-down direction compared with the other part of the installation portion 45b.

The second metal fitting 40b includes a curved portion 46b. The curved portion 46b is shaped like the letter U and protrudes inward in the second metal fitting 40b. The curved portion 46b adjoins the first base portion 41b substantially over the entire length of the first base portion 41b. The curved portion 46b also adjoins a part of each second base portion 42b, the part positioned closer to the other side in the right-left direction. The second metal fitting 40b includes an inner peripheral surface 47b1 that adjoins the curved portion 46b from inside and is formed seamlessly in the front-rear and right-left directions. The second metal fitting 40b includes an outer peripheral surface 47b2 that is formed seamlessly in the front-rear and right-left directions from one of the installation portions 45b to the other. The outer peripheral surface 47b2 includes the outer surfaces of the first base portion 41b and the second base portions 42b. The outer peripheral surface 47b2 is formed such that these outer surfaces are connected to each other smoothly and seamlessly without having a gap therebetween. The outer peripheral surface 47b2 is formed continuously so as to extend in the longitudinal direction from one of the installation portions 45b, bend and further extend in the transverse direction, and bend again and extend in the longitudinal direction to the other installation portion 45b.

The second metal fitting 40b includes contact arms 48b each shaped like the letter U. Each contact arm 48b adjoins a portion of each second base portion 42b, the portion positioned closer to the one side in the right-left direction. Each contact arm 48b has a portion extending inward in the front-rear direction and having spring elasticity. The second metal fitting 40b includes second mount portions 49b positioned at bottom ends of outside portions of respective second base portions 42b, the outside portions facing outward in the front-rear direction. Each second mount portion 49b extends substantially over the entire length of the second base portion 42b in the right-left direction.

Figure 7:
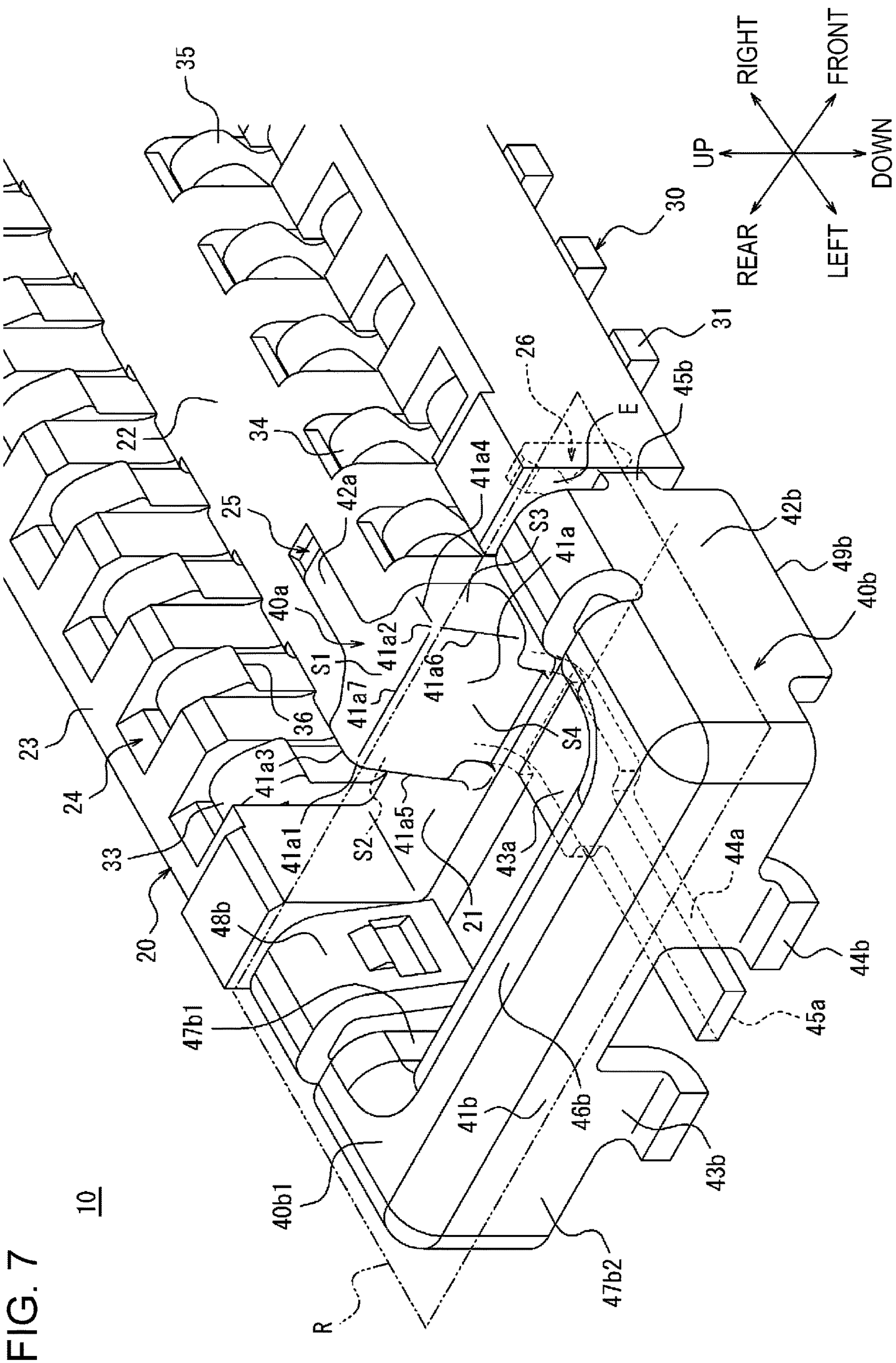
FIG. 7 is an enlarged view illustrating the region V surrounded by the dash-dot line in FIG. 3.
Figure 8:
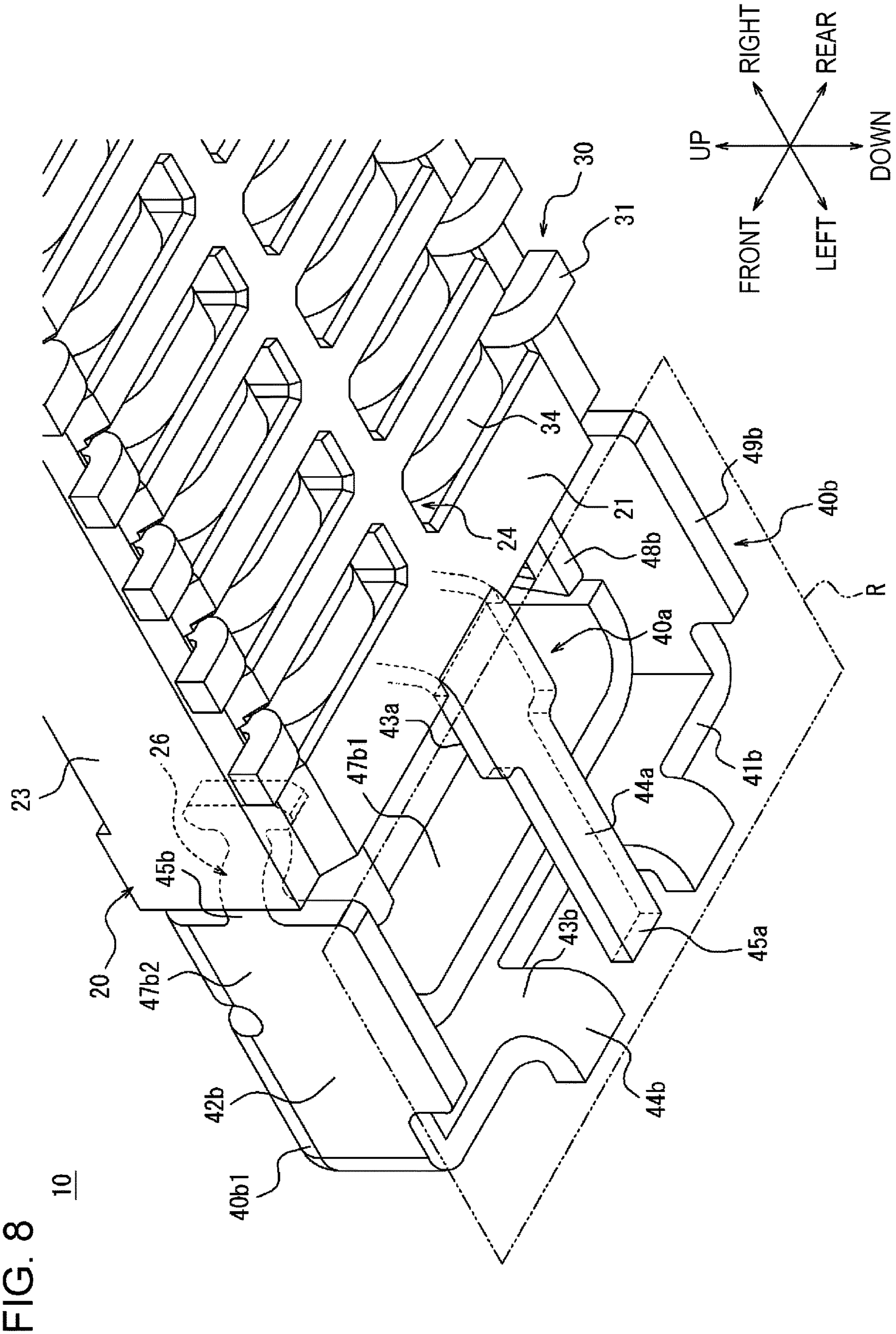
FIG. 8 is an enlarged view illustrating the connector of FIG. 7 as viewed from below.

FIG. 7 is an enlarged view illustrating the region V surrounded by the dash-dot line in FIG. 3. FIG. 8 is an enlarged view illustrating the connector 10 of FIG. 7 as viewed from below.

Each first contact 30 is press-fitted into the first insulator 20 from below. In this state, the locking portion 32 of the first contact 30 is locked between inside surfaces of each first-contact mounting groove 24, the inside surfaces facing each other in the right-left direction. The first contact 30 is thereby held in the first-contact mounting groove 24. Multiple first contacts 30 are mounted in the outer walls 23 of the first insulator 20.

When each first contact 30 is held in the corresponding first-contact mounting groove 24 of the first insulator 20, the elastic contact point 35 and the contact point 36 project from the first-contact mounting groove 24 into the space between the engagement projection 22 and the corresponding outer wall 23. The elastic contact arm 34 of the first contact 30 is elastically deformable in the front-rear direction inside the first-contact mounting groove 24. The tip end of each mount portion 31 is positioned so as to be substantially flush with the outer wall 23 in the front-rear direction.

As illustrated in FIGS. 7 and 8, the first metal fitting 40*a* and the second metal fitting 40*b* are separate members. The first metal fitting 40*a* is spaced from the second metal fitting 40*b*. In the separated state, the first metal fitting 40*a* opposes the second metal fitting 40*b* in the right-left direction. The first metal fitting 40*a* and the second metal fitting 40*b* have different strengths. In other words, the strength of one of the first metal fitting 40*a* and the second metal fitting 40*b* is greater than the strength of the other. For example, the strength of the first metal fitting 40*a* can be greater than that of the second metal fitting 40*b*. For example, the strength of the material of the first metal fitting 40*a* can be greater than that of the material of the second metal fitting 40*b*. For example, the term "strength" as used herein includes tensile strength.

The first metal fitting 40*a* and the second metal fitting 40*b* may be made of different materials. For example, the material of the first metal fitting 40*a* can be stainless steel, and the material of the second metal fitting 40*b* can be phosphor bronze. The materials are not limited to the above. The material of the first metal fitting 40*a* and the material of the second metal fitting 40*b* may be selected arbitrarily from a group of material candidates so as to satisfy the condition that the strength of the first metal fitting 40*a* is greater than the strength of the second metal fitting 40*b*. The term "group of material candidates" include, for example, stainless steel, phosphor bronze, iron, Corson copper, copper titanium, beryllium copper, and aluminum.

The first metal fitting 40*a* can be made of the same type of material as that of the second metal fitting 40*b* insofar as the strength of the first metal fitting 40*a* is greater than the strength of the second metal fitting 40*b*. Even if the first metal fitting 40*a* and the second metal fitting 40*b* are made of the same type of alloy, such as phosphor bronze, the strength of the first metal fitting 40*a* can be made greater than that of the second metal fitting 40*b* if, for example, the number, type, or quality of the alloy is different. For example, even if the first metal fitting 40*a* and the second metal fitting 40*b* are made of the same type of material, such as phosphor bronze, the thickness of the first metal fitting 40*a* can be made greater than that of the second metal fitting 40*b*, which increases the strength of the first metal fitting 40*a* relative to that of the second metal fitting 40*b* (to be described later).

For example, the strength of the first contact 30 can be substantially the same as that of the second metal fitting 40*b*. The strength of the first metal fitting 40*a* can be greater than those of the second metal fitting 40*b* and the first contact 30. The materials of the first metal fitting 40*a*, the second metal fitting 40*b*, and the first contact 30 may be selected arbitrarily from the group of material candidates so as to satisfy the above strength relations among the first metal fitting 40*a*, the second metal fitting 40*b*, and the first contact 30.

The first metal fittings 40*a* are attached to respective ends of the engagement projection 22, the ends being positioned oppositely in the longitudinal direction of the connector 10. Each first metal fitting 40*a* extends in the longitudinal direction of the connector 10 from the engagement projection 22 to the corresponding first base portion 41*b* of the second metal fitting 40*b*.

For example, each first metal fitting 40*a* is embedded integrally in the corresponding first-metal-fitting holding portion 25 of the first insulator 20 using insert molding. Here, the first base portion 41*a* is embedded integrally in an end portion of the engagement projection 22, the end portion being positioned in the right-left direction, so as to extend from the top surface to the side surfaces of the end portion. The first base portion 41*a* is formed integrally in the first-metal-fitting holding portion 25. The first base portion 41*a* covers each end portion of the engagement projection 22 entirely from outside, each end portion being positioned in the right-left direction.

More specifically, the first end portion 41*a*1 covers the first intersection portion R1. The second end portion 41*a*2 covers the second intersection portion R2. The first projected portion 41*a*3 covers the first intersection line L1 and the boundary region of the first intersection line L1 in the first face 221 and the second face 222. The second projected portion 41*a*4 covers the second intersection line L2 and the boundary region of the second intersection line L2 in the first face 221 and the third face 223. The third projected portion 41*a*5 covers the third intersection line L3 and the boundary region of the third intersection line L3 in the second face 222 and the fourth face 224. The fourth projected portion 41*a*6 covers the fourth intersection line L4 and the boundary region of the fourth intersection line L4 in the third face 223 and the fourth face 224. The fifth projected portion 41*a*7 covers the fifth intersection line L5 and the boundary region of the fifth intersection line L5 in the first face 221 and the fourth face 224. The first flat surface S1, the second flat surface S2, the third flat surface S3, and the fourth flat surface S4 cover the first face 221, the second face 222, the third face 223, and the fourth face 224, respectively.

The first flat surface S1 of the first base portion 41*a* is flush with the top surface of the engagement projection 22. The second flat surface S2 and the third flat surface S3 of the first base portion 41*a* are flush with respective side surfaces of the engagement projection 22. The first flat surface S1 of the first base portion 41*a* is not limited to this. The first flat surface S1 of the first base portion 41*a* does not need to be flush with the top surface of the engagement projection 22. For example, the first flat surface S1 of the first base portion 41*a* may be positioned below the top surface of the engagement projection 22. The second flat surface S2 and the third flat surface S3 of the first base portion 41*a* do not need to be flush with respective side surfaces of the engagement projection 22. For example, the second flat surface S2 and the third flat surface S3 of the first base portion 41*a* may be positioned further inside from the corresponding side surfaces of the engagement projection 22 in the front-rear direction.

The hook portion 42*a* is embedded integrally in the engagement projection 22 at the top surface thereof in such a manner that the tip end 42*a*1 of the hook portion 42*a* is embedded in the engagement projection 22. The top surface of the hook portion 42*a* is exposed from the first insulator 20. For example, the top surface of the hook portion 42*a* is positioned so as to be flush with the top surface of the engagement projection 22. The top surface of the hook portion 42*a* is not limited to this but may be positioned below the top surface of the engagement projection 22.

The second base portion 43*a* of the first metal fitting 40*a* is entirely exposed from the first insulator 20 in the region R. The second base portion 43*a* extends from the engagement projection 22 to the first base portion 41*b* of the second metal fitting 40*b*. The end portion of the second base portion 43*a* including the mount portion 45*a* is positioned directly below the first base portion 41*b* of the second metal fitting 40*b*. In the region R, the second base portion 43*a* is surrounded by the peripheral portion 40*b*1 of the second metal fitting 40*b* from both sides in the front-rear direction and from the outside in the right-left direction.

The mount portion 45*a* of the first metal fitting 40*a* to be attached to the circuit substrate CB1 includes the bottom surface of the second base portion 43*a* that faces the circuit substrate CB1. For example, the mount portion 45*a* has an area extending in the front-rear and right-left directions on the bottom surface of the second base portion 43*a*. The mount portion 45*a* is positioned directly below the first base portion 41*b* of the second metal fitting 40*b* in the right-left direction. The mount portion 45*a* is positioned between the first mount portions 44*b* of the second metal fitting 40*b* in the front-rear direction.

Each second metal fitting 40*b* is attached to the end portions E of the outer walls 23 located in the longitudinal direction. More specifically, each installation portion 45*b* of the second metal fitting 40*b* is attached to the corresponding end portion E of each outer wall 23. The installation portion 45*b* is embedded integrally in the corresponding end portion E of the outer wall 23 of the first insulator 20 using insert molding. Thus, each second metal fitting 40*b* is held by the second-metal-fitting holding portions 26 of the first insulator 20. In the second metal fitting 40*b*, a recess is defined by the lower edge of the first base portion 41*b* and by the mutually opposing edges of respective protruding portions 43*b* that are spaced in the front-rear direction. The mount portion 45*a* of the first metal fitting 40*a* is positioned in the recess.

After each second metal fitting 40*b* is held by the second-metal-fitting holding portions 26 of the first insulator 20, the peripheral portion 40*b*1 of the second metal fitting 40*b* serves as the periphery of the connector 10 in the region R. In the region R, the periphery of the connector 10 is formed only by the second metal fitting 40*b*. In the region R, a front part of the second base portion 42*b*, which extends in the right-left direction from the end portion E of the front outer wall 23, serves as a front part of the periphery extending in the right-left direction of the connector 10. In the region R, the first base portion 41*b*, which extends in the front-rear direction, serves as the periphery extending in the front-rear direction of the connector 10. In the region R, a rear part of the second base portion 42*b*, which extends in the right-left direction from the end portion E of the rear outer wall 23, serves as a rear part of the periphery extending in the right-left direction of the connector 10. In the region R, only the second metal fitting 40*b* is present, and the first insulator 20 is not formed.

The peripheral portion 40*b*1 of the second metal fitting 40*b* has a dual-wall structure extending along peripheral sides of the connector 10 in the region R. For example, the peripheral portion 40*b*1 is formed such that a pair of inside and outside walls, which are connected by the curved portion 46*b*, extend in the front-rear and right-left directions continuously in parallel with each other. The inner peripheral surface 47*b*1 formed on the inside wall of the peripheral portion 40*b*1 and the outer peripheral surface 47*b*2 formed on the outside wall of the peripheral portion 40*b*1 extend in the front-rear and right-left directions continuously in parallel with each other. For example, in the peripheral portion 40*b*1, each contact arm 48*b*, which is shaped like the letter U, includes a pair of inside and outside walls, and the inside and outside walls extend in the right-left direction in parallel with each other.

The second base portion 43*a* of the first metal fitting 40*a* is surrounded by the peripheral portion 40*b*1 of the second metal fitting 40*b* from both sides in the front-rear direction and from the outside in the right-left direction. More specifically, the second base portions 42*b* of the peripheral portion 40*b*1 of the second metal fitting 40*b* are disposed at both sides of the second base portion 43*a* of the first metal fitting 40*a* in the front-rear direction. The first base portion 41*b*, the protruding portions 43*b*, and the curved portion 46*b* of the peripheral portion 40*b*1 are disposed so as to superpose the end portion of the second base portion 43*a* of the first metal fitting 40*a* in the right-left direction. Each contact arm 48*b* of the second metal fitting 40*b* includes an elastically deformable portion that is positioned inside in the front-rear direction and extends downward and is deformable in the front-rear direction.

The first mount portions 44*b* of the second metal fitting 40*b* are disposed side-by-side in the transverse direction of the connector 10. The first mount portions 44*b* are positioned respectively at both sides of the second base portion 43*a* of the first metal fitting 40*a* in the transverse direction of the connector 10. A pair of the first mount portions 44*b* are positioned so as to straddle the second base portion 43*a* of the first metal fitting 40*a* in the front-rear direction. More specifically, the first mount portions 44*b* are positioned so as to straddle the mount portion 45*a* of the second base portion 43*a* in the front-rear direction, the mount portion 45*a* being positioned at the end of the second base portion 43*a* in the right-left direction. For example, the first mount portions 44*b* are disposed respectively at symmetrical positions in the front-rear direction with respect to the mount portion 45*a* of the second base portion 43*a* of the first metal fitting 40*a*.

The second mount portions 49*b* of the second metal fitting 40*b* are disposed so as to extend in the longitudinal direction of the connector 10. The second mount portions 49*b* are positioned respectively at both sides of the second base portion 43*a* of the first metal fitting 40*a* in the transverse direction of the connector 10. A pair of the second mount portions 49*b* are positioned so as to straddle the second base portion 43*a* of the first metal fitting 40*a* in the front-rear direction. For example, the second mount portions 49*b* are disposed respectively at symmetrical positions in the front-rear direction with respect to the narrow portion 44*a* of the second base portion 43*a*. In the right-left direction, the second mount portions 49*b* are disposed substantially at the same positions as that of the second base portion 43*a* that includes the mount portion 45*a* and the narrow portion 44*a*.

In the connector 10 with the above-described structure, the mount portions 31 of respective first contacts 30 are soldered to patterned traces formed on the mount surface of the circuit substrate CB1. The mount portion 45*a* of each first metal fitting 40*a*, and the first mount portions 44*b* and the second mount portions 49*b* of each second metal fitting 40*b* are soldered to corresponding patterned traces formed on the mount surface. Thus, the mount portions are fixed to the circuit substrate CB1, and the connector 10 is thereby mounted onto the circuit substrate CB1. For example, electronic components other than the connector 10, such as a central processing unit (CPU), a controller, and a memory, are also mounted on the mount surface of the circuit substrate CB1.

Figure 9:
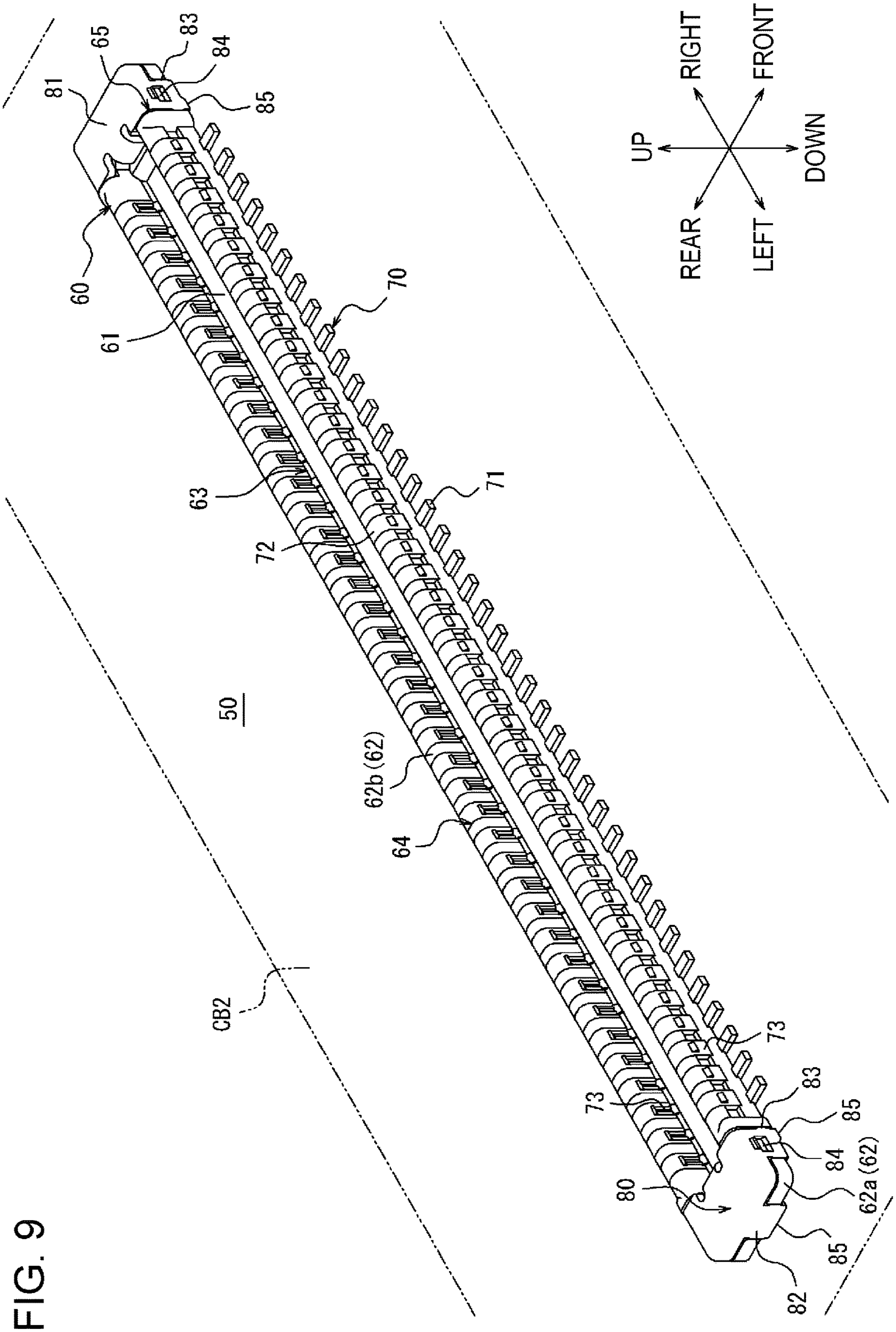
FIG. 9 is a perspective view, as viewed from above, illustrating the exterior of the connection object of FIG. 1.

The following describes the structure of the connection object 50 with reference mainly to FIG. 9.

FIG. 9 is a perspective view, as viewed from above, illustrating the exterior of the connection object 50 of FIG. 1. The connection object 50 can be obtained, for example, by forming the second insulator 60 integrally with the second contacts 70 using insert molding, and the metal fittings 80 are press-fitted into the second insulator 60 from above.

The second insulator 60 is a plate-like member elongated in the right-left direction. The second insulator 60 is made of a synthetic resin having insulating and heat-resisting properties using injection molding. The second insulator 60 includes a bottom plate 61 that constitutes the bottom part of the second insulator 60. The second insulator 60 includes annularly formed peripheral walls 62 that protrude upward from peripheral portions of the bottom plate 61, the peripheral portions extending in the front-rear and right-left directions. The peripheral walls 62 include transverse walls 62*a* and longitudinal walls 62*b*. The transverse walls 62*a* extend in the front-rear direction. The longitudinal walls 62*b* extend in the right-left direction. The second insulator 60 includes an engagement recess 63 surrounded by the peripheral walls 62 in the front-rear direction and in the right-left direction.

The second insulator 60 includes second-contact holding portions 64 each of which is formed continuously in each longitudinal wall 62*b* and in the bottom plate 61. The second contacts 70 are mounted in respective second-contact holding portions 64. The second insulator 60 includes metal-fitting holding portions 65 formed in respective transverse walls 62*a*. The metal fittings 80 are attached to respective metal-fitting holding portions 65.

Each second contact 70 having a shape as illustrated is formed, for example, of a thin plate made of a copper alloy, such as phosphor bronze, beryllium copper, or copper-titanium alloy, or of a Corson system copper alloy, using progressive metal forming (stamping). The surface of the second contact 70 is plated with nickel to form a foundation layer and further plated with gold or tin thereover.

The second contact 70 includes a mount portion 71 that is an L-shaped protrusion protruding outward in the front-rear direction. The second contact 70 includes a curved portion 72 that is shaped like the letter U. The curved portion 72 protrudes upward from the mount portion 71. The second contact 70 includes a pair of contact points 73 that are formed on respective side surfaces of the second contact 70, the side surfaces facing in the front-rear direction and being positioned at both sides of the curved portion 72.

Each second contact 70 is embedded integrally in a corresponding second-contact holding portion 64 of the second insulator 60 using insert molding. A pair of the contact points 73 are disposed respectively at the front surface and at the rear surface of each longitudinal wall 62*b*. The mount portion 71 protrude outward through the bottom plate 61 and further extend outward in the front-rear direction. The tip end of the mount portion 71 is positioned outside the longitudinal wall 62*b* in the front-rear direction.

Each metal fitting 80 is formed of a thin plate of an arbitrary metal so as to have a shape as illustrated, using progressive metal forming (stamping). The method of manufacturing the metal fitting 80 includes a step of punching out a piece and a step of bending the punched piece in the thickness direction.

The metal fitting 80 includes a base portion 81 shaped tabularly. The metal fitting 80 includes first extension portions 82 that are shaped like the letter L. In the right-left direction, one of the first extension portions 82 extends outward from the outside edge of the base portion 81, and the other one extends inward from the inside edge of the base portion 81. The metal fitting 80 includes second extension portions 83 that extend outward from respective opposite ends of the base portion 81 in the front-rear direction. Each second extension portion 83 is shaped like the letter L. The metal fitting 80 includes contact points 84 that are formed at respective outside surfaces of the second extension portions 83, the outside surfaces facing in the front-rear direction. The metal fitting 80 includes mount portions 85 positioned at the bottom ends of the second extension portions 83 and the outward-facing first extension portion 82. Each metal fitting 80 is attached to the second insulator 60 with the first extension portions 82 and the second extension portions 83 being fitted in each metal-fitting holding portion 65 of the second insulator 60.

In the connection object 50 with the above-described structure, the mount portions 71 of respective second contacts 70 are soldered to patterned traces formed on the mount surface of the circuit substrate CB2. The mount portions 85 of the metal fittings 80 are soldered to patterned traces formed on the mount surface. Thus, the connection object 50 is mounted on the circuit substrate CB2. For example, electronic components other than the connection object 50, such as a communication module, are also mounted on the mount surface of the circuit substrate CB2.

Figure 10:
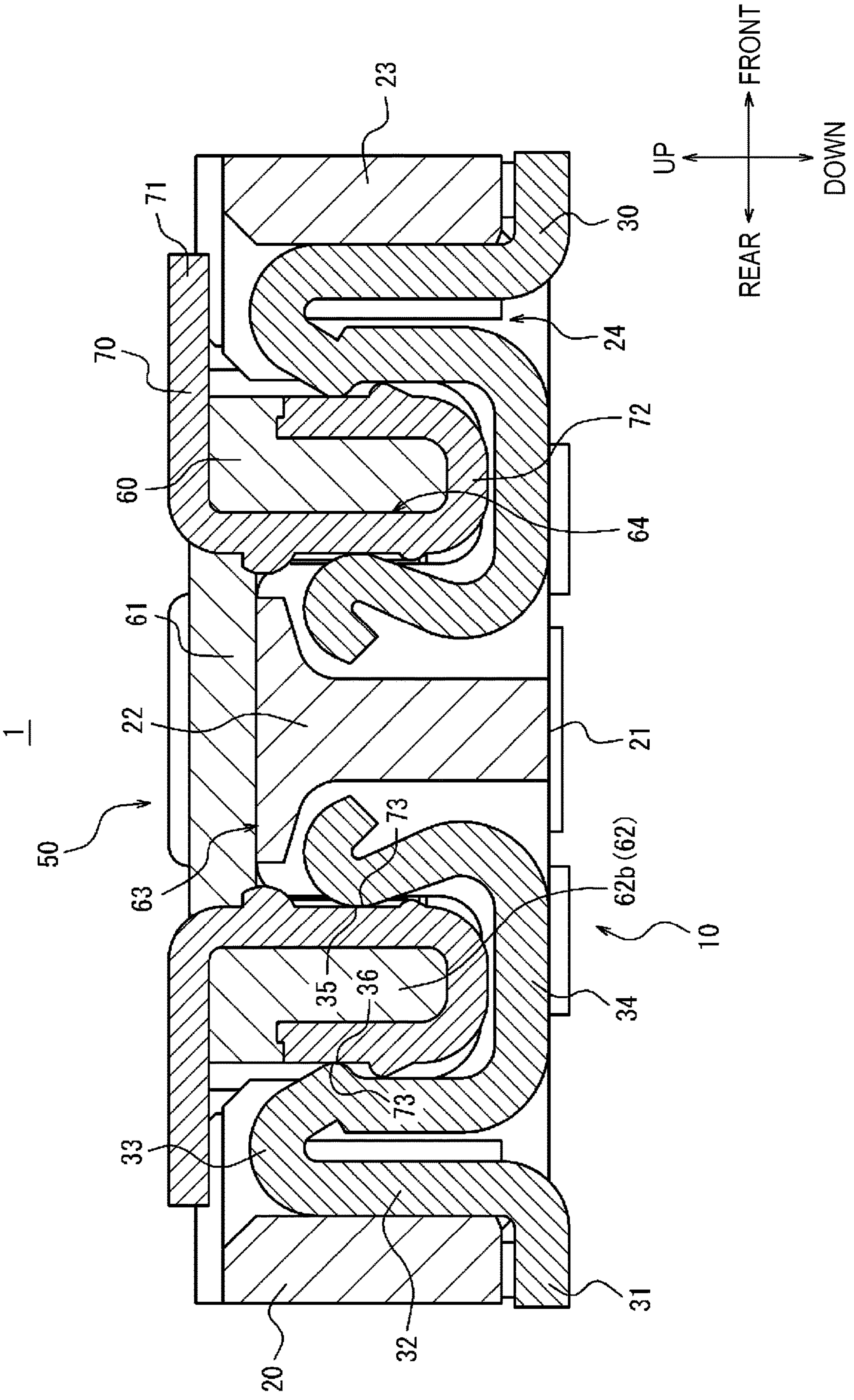
FIG. 10 is a cross-sectional view of the connector module taken along line X-X in FIG. 1.
Figure 11:
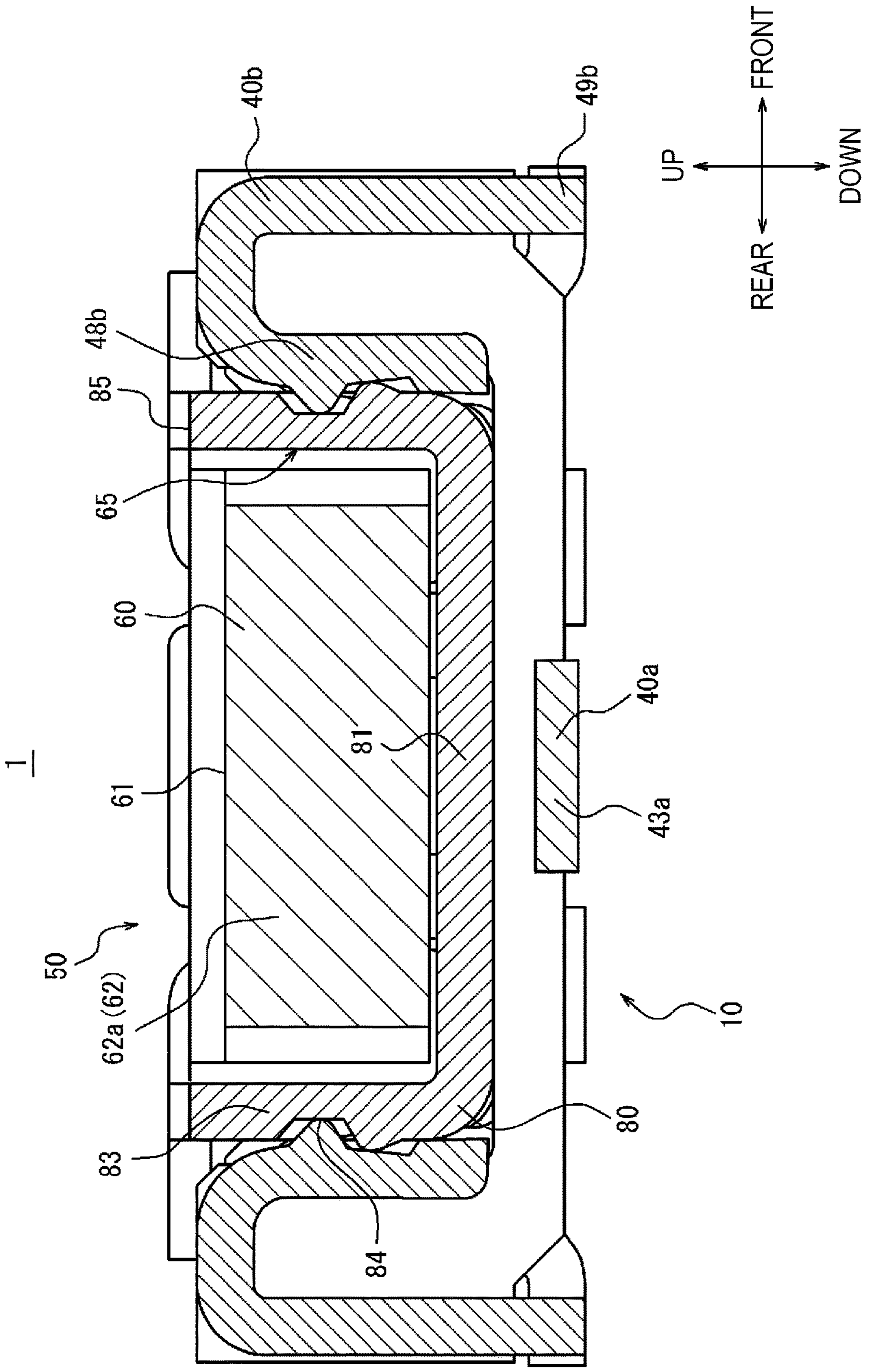
FIG. 11 is a cross-sectional view of the connector module taken along line XI-XI in FIG. 1.
Figure 12:
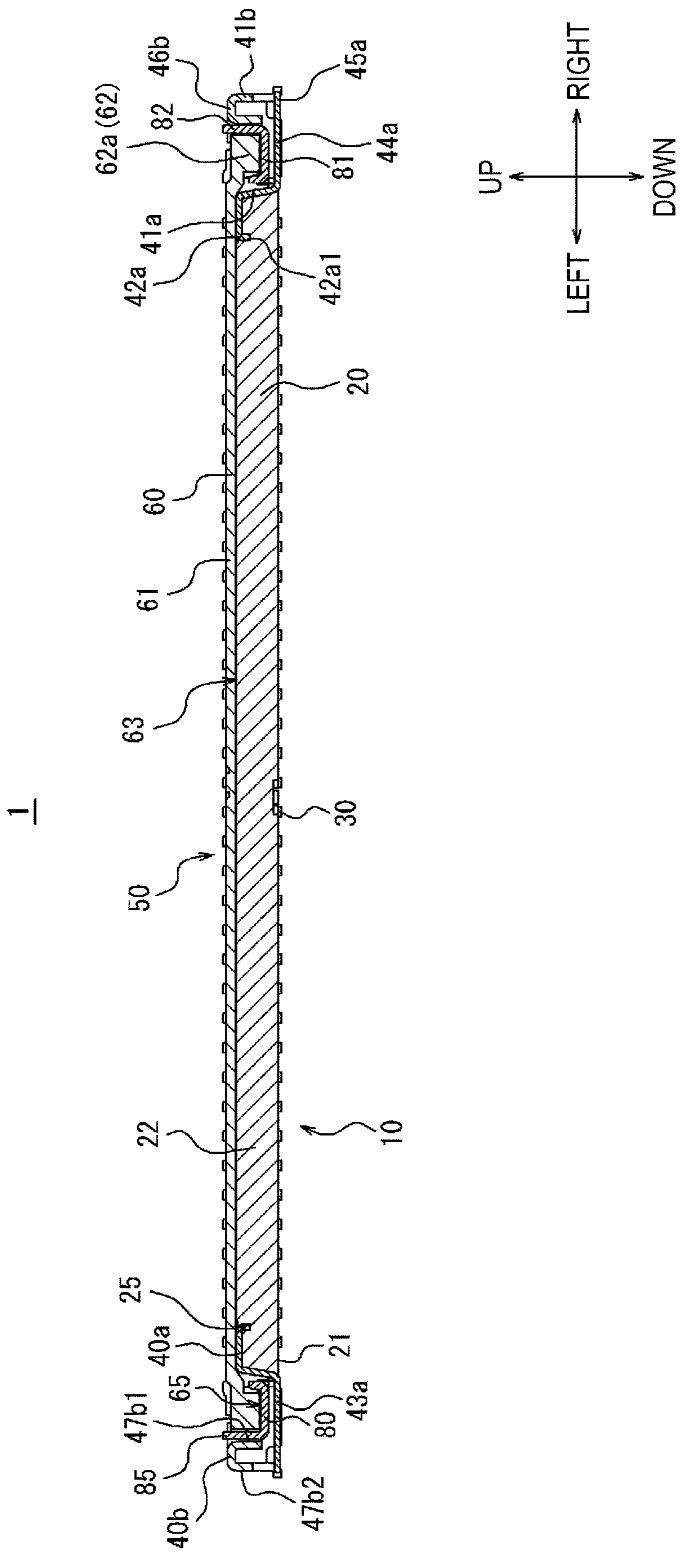
FIG. 12 is a cross-sectional view of the connector module taken along line XII-XII in FIG. 1.

With reference to FIGS. 10 to 12, the following description focuses on the structure of the connector module 1 in the engagement state in which the connector 10 and the connection object 50 are connected together and the first insulator 20 and the second insulator 60 engage each other. FIG. 10 is a cross-sectional view of the connector module 1 taken along line X-X in FIG. 1.

For example, the orientation of the connection object 50 illustrated in FIG. 9 is first reversed upside down. In this state, the connection object 50 is positioned so as to oppose the connector 10 while the connector 10 and the connection object 50 are substantially aligned with each other in the front-rear and right-left directions. The connection object 50 is subsequently moved downward. The connection object 50 and the connector 10 are thereby connected to each other, in other words, the connector module 1 is in the connection state. Here, the engagement projection 22 of the first insulator 20 engages the engagement recess 63 of the second insulator 60.

In the engagement state, the elastic contact point 35 of each first contact 30 comes into contact with a corresponding contact point 73 of each second contact 70, and the elastic contact arm 34 having the spring elasticity is elastically deformed inward in the front-rear direction. In the engagement state, the contact point 36 of the first contact 30 comes into contact with the other contact point 73 of the second contact 70. The first contact 30 comes into contact with the second contact 70 at two points in the front-rear direction, in other words, at a point between the elastic contact point 35 and one of the contact points 73 and at another point between the contact point 36 and the other contact point 73.

FIG. 11 is a cross-sectional view of the connector module 1 taken along line XI-XI in FIG. 1.

In the engagement state, the contact arms 48*b* of each second metal fitting 40*b* come into contact with the corresponding contact points 84 of each metal fitting 80. Here, the contact arms 48*b* having the spring elasticity deform elastically outward in the front-rear direction. The second metal fitting 40*b* and the metal fitting 80 come into contact with each other at two points in the front-rear direction using the contact arms 48*b* and the contact points 84.

The top surface of the second base portion 43*a* of the first metal fitting 40*a* opposes the base portion 81 of the metal fitting 80 in the up-down direction. The top surface of the second base portion 43*a* and the base portion 81 are spaced from each other in the up-down direction. Accordingly, even if solder reaches the top surface of the second base portion 43*a*, the solder is accommodated in the space between the top surface of the second base portion 43*a* and the base portion 81 of the metal fitting 80. This reduces the occurrence of poor engagement between the connector 10 and the connection object 50. This can avoid the occurrence of the situation in which the connector 10 does not engage the connection object 50 properly due to the presence of residual solder.

As illustrated in FIG. 8, the first insulator 20 is not present around the mount portion 45*a*, which enables the amount of solder to be increased at the mount portion 45*a*. This increases the mounting strength of the connector 10 mounted on the circuit substrate CB1. For example, this enables side fillets of solder to be formed at the mount portion 45*a*. This further increases the mounting strength of the connector 10 mounted on the circuit substrate CB1. Accordingly, the sturdiness of the connector 10 improves.

FIG. 12 is a cross-sectional view of the connector module 1 taken along line XII-XII in FIG. 1.

Each metal fitting 80 of the connection object 50 is positioned between the corresponding first metal fitting 40*a* and the corresponding second metal fitting 40*b* in the engagement state in which the connector 10 and the connection object 50 engage each other. The metal fitting 80 is positioned between the first metal fitting 40*a* and the second metal fitting 40*b* in the longitudinal direction of the connector 10. In the engagement state, the second base portion 43*a* of the first metal fitting 40*a* is disposed so as to oppose the base portion 81 of the metal fitting 80 in the up-down direction with a space therebetween. In the engagement state, the inner peripheral surface 47*b*1 of the second metal fitting 40*b* is disposed so as to oppose the outward-facing first extension portion 82 of the metal fitting 80 in the right-left direction. In the engagement state, the first base portion 41*a* of the first metal fitting 40*a* is disposed so as to oppose the inward-facing first extension portion 82 of the metal fitting 80 in the right-left direction.

Multiple first contacts 30 are arranged in a row in the arrangement direction, which is parallel to the longitudinal direction of the connector 10. In the arrangement direction, each first metal fitting 40*a* superposes a one first contact 30 positioned at each end of the row. For example, as illustrated in FIG. 7, the hook portion 42*a* of the first metal fitting 40*a* superposes the one first contact 30 positioned at the end in the arrangement direction. For example, a part of the hook portion 42*a*, the part extending in the right-left direction, comes to the position of the one first contact 30 in the right-left direction.

As illustrated in FIG. 12, the tip end 42*a*1 of the hook portion 42*a* of the first metal fitting 40*a* is positioned, in the arrangement direction, between the one first contact 30 and an adjacent first contact 30 disposed next to the one first contact 30. For example, another part of the hook portion 42*a*, another part extending in the right-left direction, is also positioned, together with the tip end 42*a*1 extending in the up-down direction, between the one first contact 30 and the adjacent first contact 30 positioned next to the one first contact 30 in the arrangement direction.

In FIG. 12, the thickness of each first metal fitting 40*a* is substantially equal to or smaller than the thickness of the second metal fitting 40*b*. The thickness of the first metal fitting 40*a*, however, can be made greater than the thickness of the second metal fitting 40*b* in order to increase the strength of the first metal fitting 40*a* relative to the second metal fitting 40*b*, for example, in a case where the first metal fitting 40*a* and the second metal fitting 40*b* are made of the same material.

According to the connector 10 of the embodiment described above, the occurrence of the malfunction of the connector 10 caused by the first insulator 20 can be reduced even if the size and height of the connector 10 are reduced. The peripheral portion 40*b*1 of the second metal fitting 40*b* is positioned at each longitudinal end of the connector 10 and constitutes the periphery of the connector 10 in each region R positioned outside the corresponding end portions E of the outer walls 23. In the region R, only the peripheral portion 40*b*1 is present without other members being present. Accordingly, this eliminates the necessity of mounting the peripheral portion 40*b*1 of the second metal fitting 40*b* onto the longitudinal end portion of the first insulator 20, which is required in the related art. Because the first insulator 20 is not present in the region R where the peripheral portion 40*b*1 is positioned, a problem such as the abrasion of the first insulator 20 does not occur at all in the region R. Accordingly, the occurrence of such a problem of the first insulator 20 can be reduced, which thereby reduces the occurrence of a problem of the connector 10 caused by the first insulator 20.

As described above, the first insulator 20 is not present in the region R where the peripheral portion 40*b*1 is positioned. Accordingly, a problem of the first insulator 20, such as warping or breakage, does not occur at all in the region R even if the first insulator 20 becomes thinner as a result of the size and height of the connector 10 being reduced. This reduces the likelihood of the first insulator 20 having such a problem, which further reduces the likelihood of the connector 10 having related problems caused by the first insulator 20.

In the region R, only the second metal fitting 40*b* is present, and the first insulator 20 is not present. Accordingly, the abrasion, warping, or breakage of the first insulator 20 cannot occur in the entire region R. This reduces the likelihood of the first insulator 20 having such a problem, which further reduces the likelihood of the connector 10 having related problems caused by the first insulator 20.

In addition, the first insulator 20 is not present in the entire region R, which improves the heat dissipation of the second metal fitting 40*b* when an electric current flows in the second metal fitting 40*b*. The second metal fitting 40*b* does not need to be mounted on the first insulator 20 in the region R, which enables the thickness of the second metal fitting 40*b* to change more freely even if the size and height of the connector 10 are reduced. For example, this enables the thickness of the second metal fitting 40*b* to increase in order to increase the cross section through which the electric current flows. Accordingly, the connector 10 enables a large electric current to flow in the second metal fitting 40*b*.

Because of the first insulator 20 being not present in the entire region R, the longitudinal length of the connector 10 can be reduced by an amount equal to the lengths of respective regions R positioned at opposite longitudinal ends of the connector 10. In a case of the connector 10 being elongated in the longitudinal direction to accommodate a large number of the first contacts 30, the connector 10 becomes more vulnerable to a problem such as warping. The connector 10, however, can be reduced in length as described above, which reduces the occurrence of such a problem.

The outer peripheral surface 47*b*2 is formed continuously on the peripheral portion 40*b*1 from one of the installation portions 45*b* to the other, which improves the strength of the second metal fitting 40*b*. Accordingly, the sturdiness of the connector 10 can be improved even in the case of the connector 10 being reduced in size and height. This reduces, for example, the occurrence of a problem, such as breakage of the second metal fitting 40*b*, caused by the connection object 50 during engagement or disengagement between the connector 10 and the connection object 50. This improves the product reliability of the connector 10.

In the peripheral portion 40*b*1, the inner peripheral surface 47*b*1 is formed so as to adjoin the curved portion 46*b* from inside and so as to extend seamlessly in the front-rear and right-left directions, which further improves the strength of the second metal fitting 40*b*. This further improves the sturdiness of the connector 10 even in the case of the connector 10 being reduced in size and height. This reduces, for example, the occurrence of a problem, such as breakage of the second metal fitting 40*b*, caused by the connection object 50 during engagement or disengagement between the connector 10 and the connection object 50. Accordingly, the product reliability of the connector 10 is further improved.

The peripheral portion 40*b*1 has the dual-wall structure extending along peripheral sides of the connector 10 in the region R, which further improves the strength of the second metal fitting 40*b*. This further enhances the above-described advantageous effects related to the sturdiness and the product reliability of the connector 10.

The installation portions 45*b* of the second metal fitting 40*b* are embedded integrally in the first insulator 20 using insert molding, which increases the holding strength of the first insulator 20 holding the second metal fitting 40*b*. Accordingly, the second metal fitting 40*b* can be securely fixed to the first insulator 20 even if the first insulator 20 is not present at the position of the peripheral portion 40*b*1.

In the connector 10, each first metal fitting 40*a* includes the first end portion 41*a*1 disposed at the first intersection portion R1 of the engagement projection 22 and also includes the second end portion 41*a*2 disposed at the second intersection portion R2 of the engagement projection 22. With this configuration, the connector 10 can reliably protect the intersection portions of the engagement projection 22, which tend to suffer defects, such as wear or breakage, during engagement and disengagement between the connector 10 and the connection object 50. The first metal fitting 40*a* covers part of the first insulator 20 at each intersection portion of the engagement projection 22, which can improve the sturdiness of the intersection portion of the first insulator 20. This reduces the occurrence of a problem, such as breakage of the engagement projection 22 of the first insulator 20, when the connection object 50 hits the first insulator 20 during engagement or disengagement between the connector 10 and the connection object 50. Accordingly, this reduces the likelihood of broken pieces of the first insulator 20 adhering to the first contacts 30 and leading to poor connection. As a result, the product reliability of the connector 10 is improved.

The first metal fitting 40*a* includes the first projected portion 41*a*3, which can protect the first intersection line L1 and the boundary region thereof in the first face 221 and the second face 222. The first metal fitting 40*a* includes the second projected portion 41*a*4, which can protect the second intersection line L2 and the boundary region thereof in the first face 221 and the third face 223. Accordingly, the sturdiness of the engagement projection 22 is further improved. This further improves the sturdiness of the first insulator 20. As a result, the advantageous effects related to the sturdiness and the reliability of the connector 10 can be further enhanced.

The first metal fitting 40*a* includes the third projected portion 41*a*5, which can protect the third intersection line L3 and the boundary region thereof in the second face 222 and the fourth face 224. The first metal fitting 40*a* includes the fourth projected portion 41*a*6, which can protect the fourth intersection line L4 and the boundary region thereof in the third face 223 and the fourth face 224. Accordingly, the sturdiness of the engagement projection 22 is further improved. This further improves the sturdiness of the first insulator 20. As a result, the advantageous effects related to the sturdiness and the reliability of the connector 10 can be further enhanced. For example, the third projected portion 41*a*5 and the fourth projected portion 41*a*6 can reduce the occurrence of wear or breakage of the corresponding portions of the engagement projection 22 when the connection object 50 is rotated, in a plane orthogonally intersecting the up-down direction, relative to the connector 10 during and after the engagement between the connector 10 and the connection object 50.

The first metal fitting 40*a* includes the fifth projected portion 41*a*7, which can protect the fifth intersection line L5 and the boundary region thereof in the first face 221 and the fourth face 224. Accordingly, the sturdiness of the engagement projection 22 is further improved. This further improves the sturdiness of the first insulator 20. As a result, the advantageous effects related to the sturdiness and the reliability of the connector 10 can be further enhanced. For example, during the engagement between the connector 10 and the connection object 50, the connection object 50 is likely to hit the engagement projection 22 at the fifth intersection line L5 and in the boundary region thereof in the first face 221 and the fourth face 224. The fifth projected portion 41*a*7 can reduce the occurrence of wear or breakage of the engagement projection 22 in the boundary region along the fifth intersection line L5.

The first metal fitting 40*a* includes at least one of the first flat surface S1, the second flat surface S2, the third flat surface S3, and the fourth flat surface S4, which can protect at least one of the first face 221, the second face 222, the third face 223, and the fourth face 224. Accordingly, the sturdiness of the engagement projection 22 is further improved. This further improves the sturdiness of the first insulator 20. As a result, the advantageous effects related to the sturdiness and the reliability of the connector 10 can be further enhanced.

The first metal fitting 40*a* seamlessly covers the first face 221, the second face 222, the third face 223, and the fourth face 224, as well as all the intersection lines therebetween, with surfaces of the first metal fitting 40*a*, the surfaces orthogonally intersecting the thickness direction of the first metal fitting 40*a*. Accordingly, the first metal fitting 40*a* can cover and protect the first insulator 20 without the first insulator 20 being exposed in the longitudinal end portion of the engagement projection 22. The first base portion 41*a*, which can provide such advantageous effects, is formed using metal drawing. Accordingly, the sturdiness of the engagement projection 22 is further improved. This further improves the sturdiness of the first insulator 20. As a result, the advantageous effects related to the sturdiness and the reliability of the connector 10 can be further enhanced.

The first flat surface S1 of the first base portion 41*a* is flush with the top surface of the engagement projection 22, and the second flat surface S2 and the third flat surface S3 of the first base portion 41*a* are flush with respective side surfaces of the engagement projection 22. The surfaces of the first metal fitting 40*a* and the first insulator 20 are connected together smoothly with no level difference. Accordingly, the sturdiness of the engagement projection 22 is further improved. This further improves the sturdiness of the first insulator 20. As a result, the advantageous effects related to the sturdiness and the reliability of the connector 10 can be further enhanced.

In the connector 10, each first metal fitting 40*a* attached to the engagement projection 22 and the corresponding second metal fitting 40*b* attached to the outer walls 23 are separate members. Compared with a known art in which the metal fitting is formed integrally as one piece, this reduces a negative impact caused due to the connection object 50 hitting a metal fitting during engagement. For example, when the connection object 50 hits a metal fitting at the engagement projection 22 or at the outer walls 23, the likelihood of the impact extending to the other metal fitting is reduced. This reduces the occurrence of breakage of the metal fittings such as the first metal fitting 40*a* and the second metal fitting 40*b*. The reduction of the occurrence of breakage of the metal fittings leads to a reduction in the occurrence of breakage of the first insulator 20 to which the metal fittings are attached. This improves the product reliability of the connector 10.

Assume that the connector 10 and the connection object 50 engage each other in a misaligned state and that the connection object 50 hits a second metal fitting 40*b* at the outer walls 23 during the engagement and causes the second metal fitting 40*b* to deform and incline outward in the right-left direction. Even in this case, the likelihood of the impact extending to the engagement projection 22 is reduced. The deformation of the first metal fitting 40*a* can be reduced since the first metal fitting 40*a* and the second metal fitting 40*b* are separate members. Assume that the connection object 50 hits a first metal fitting 40*a* at the engagement projection 22 during engagement and causes the first metal fitting 40*a* and the engagement projection 22 to deform inward into the engagement projection 22 in the right-left direction. Even in this case, the likelihood of the impact extending to the outer walls 23 is reduced. The deformation of the second metal fitting 40*b* can be reduced since the first metal fitting 40*a* and the second metal fitting 40*b* are separate members. Accordingly, the metal fittings behave differently and independently at the engagement projection 22 and at the outer walls 23. The behavior of the metal fitting at the engagement projection 22 does not readily propagate to the metal fitting at the outer walls 23, and vice versa. This reduces the occurrence of the breakage, and the metal fittings can perform expected functions reliably.

The reduction of the occurrence of breakage of the metal fittings and the first insulator 20 reduces the likelihood of displacement of the connector 10 and the connection object 50 relative to each other in the contact arrangement direction, in other words, in the longitudinal direction of the connector 10, during and after the engagement. As a result, electrical continuity between the first contacts 30 and the corresponding second contacts 70 can be achieved exactly as specified in design. The likelihood of the connector module 1 loosening can be also reduced after the engagement. Positioning function of the connector 10 and the connection object 50 relative to each other can be maintained. As a result, the connector 10 and the connection object 50 do not come off easily from each other, which improves the product reliability of the connector module 1.

In the connector 10, the first metal fitting 40*a* and the second metal fitting 40*b* are different members, which enables the strength of one of the first metal fitting 40*a* and the second metal fitting 40*b* to increase relative to the other. In the connector 10, the first metal fitting 40*a* and the second metal fitting 40*b* are attached to different members, such as the engagement projection 22 and the outer walls 23, for the different purposes. The first metal fitting 40*a* and the second metal fitting 40*b* can be formed so as to have appropriate strengths suitable for the different positions and purposes. Assume that these metal fittings are formed integrally into one piece as is the case for the known art. When it is necessary to reduce the strength of a portion of the metal fitting at the engagement projection 22 or at the outer walls 23, the strength of the other portion of the metal fitting inevitably decreases.

For example, the first metal fitting 40*a* attached to the engagement projection 22 is provided for the purpose of improving the sturdiness of the engagement projection 22. On the other hand, the second metal fitting 40*b* attached to the outer walls 23 is provided mainly for the purpose of electrical connection with the metal fitting 80 in the engagement state. For this purpose, the second metal fitting 40*b* includes the elastically deformable contact arms 48*b*.

Accordingly, the second metal fitting 40*b* is preferably made of a material having a suitable strength to serve as a spring, while the first metal fitting 40*a* is preferably made of a material that is greater in strength. In the connector 10, the first metal fitting 40*a* and the second metal fitting 40*b* can be formed so as to have appropriate strengths suitable for respective purposes. If, for example, the metal fittings are formed integrally into one piece as is the case for the known art, the necessity to form elastically deformable contact arms at respective outer walls leads to a decrease in the overall strength of the metal fitting, which results in a decrease in the sturdiness of the engagement projection.

In the connector 10, however, the material of the first metal fitting 40*a* is different from that of the second metal fitting 40*b*. These metal fittings can be formed easily so as to increase the strength of one of the first metal fitting 40*a* and the second metal fitting 40*b* relative to the strength of the other. For example, the materials of the first metal fitting 40*a* and the second metal fitting 40*b* can be selected appropriately to meet the objectives of these metal fittings.

The first metal fitting 40*a*, which is made of a material stronger than that of the second metal fitting 40*b*, improves the sturdiness of the engagement projection 22 to which the first metal fitting 40*a* is attached. This reduces the occurrence of breakage of the engagement projection 22 of the first insulator 20 to which the first metal fitting 40*a* is attached. As a result, the product reliability of the connector 10 is improved.

In the case of the first metal fitting 40*a* having a thickness greater than that of the second metal fitting 40*b*, the strength of the first metal fitting 40*a* becomes greater than that of the second metal fitting 40*b* even if, for example, the first metal fitting 40*a* and the second metal fitting 40*b* are made of the same material. With this configuration, the sturdiness of the engagement projection 22 to which the first metal fitting 40*a* is attached can be also increased.

The first metal fittings 40*a* are attached to respective opposite ends of the engagement projection 22 in the longitudinal direction of the connector 10, which improves the sturdiness of the engagement projection 22 at both ends. This further reduces the occurrence of breakage of the engagement projection 22 of the first insulator 20 to which the first metal fittings 40*a* are attached. As a result, the product reliability of the connector 10 is further improved.

In the connector 10, each first metal fitting 40*a* includes the mount portion 45*a* to be mounted on the circuit substrate CB1, which improves the sturdiness of the first metal fitting 40*a*. This reduces the deformation of the first metal fitting 40*a* even when a load is applied thereto. As a result, the dimensional accuracy and shape integrity of the connector 10 can be maintained during the engagement. This improves, for example, the sturdiness of the engagement projection 22 to which the first metal fitting 40*a* is attached. This can reduce the occurrence of breakage or deformation of the engagement projection 22 and can reduce the likelihood of the connector 10 loosening or being displaced in the longitudinal direction.

The mount portion 45*a* includes the bottom surface of the second base portion 43*a*. The second base portion 43*a* extends in the longitudinal direction of the connector 10, and the bottom surface faces the circuit substrate CB1. Accordingly, the mount portion 45*a* can receive the external force acting on the first metal fitting 40*a*. The mount portion 45*a* is fixed to the circuit substrate CB1, and the first metal fitting 40*a* is thereby fixed to the circuit substrate CB1. As a result, even if an external force acts on the first metal fitting 40*a*, the mount portion 45*a* can absorb the resulted impact. This improves the sturdiness of the first metal fitting 40*a* extending in the longitudinal direction of the connector 10. This further improves the sturdiness of the engagement projection 22 extending in the longitudinal direction of the connector 10.

The first metal fitting 40*a* superposes the one first contact 30 positioned at each end of the row of the first contacts 30 in the arrangement direction, which can reduce the length of the connector 10 in the longitudinal direction. This can reduce the longitudinal length of the connector module 1 and contribute to the overall size reduction of the connector module 1. Moreover, this improves the strength of the connector module 1 against external force.

The tip end 42*a*1 of the hook portion 42*a* of the first metal fitting 40*a* is positioned between the one first contact 30 and the adjacent first contact 30 in the arrangement direction. As a result, an arbitrarily shaped tip end structure of the hook portion 42*a* is positioned where a first-contact mounting groove 24 is not formed and the first insulator 20 has a larger thickness. This increases the holding strength of the first insulator 20 holding the tip end 42*a*1 of the hook portion 42*a*. Consequently, this increases the holding strength of the first insulator 20 holding the first metal fitting 40*a*. The arbitrarily shaped tip end structure of the hook portion 42*a* is positioned where the first insulator 20 has a larger thickness. This suppresses the stiffness reduction of the engagement projection 22 of the first insulator 20 compared with the case in which the tip end structure of the hook portion 42*a* is positioned so as to superpose the first-contact mounting groove 24.

The hook portion 42*a* is shaped like the letter L, and the tip end 42*a*1 of the hook portion 42*a* is embedded in the engagement projection 22, which reduces the likelihood of the hook portion 42*a* being turned up. This increases the holding strength of the first insulator 20 holding the hook portion 42*a*. Consequently, this increases the holding strength of the first insulator 20 holding the first metal fitting 40*a*.

The first base portion 41*a* and the second base portion 43*a* of the first metal fitting 40*a* are formed integrally so as to have the crank-like shape as a whole. Accordingly, the entire first base portion 41*a* is integrally embedded in the first insulator 20 so as to follow the shape of the end portion of the engagement projection 22. This increases the holding strength of the first insulator 20 holding the first metal fitting 40*a*.

The width of the hook portion 42*a* is smaller than the width of any other portion of the first metal fitting 40*a* in the transverse direction of the connector 10. This increases the thickness of the first insulator 20 where the hook portion 42*a* is embedded. For example, even if the hook portion 42*a* superposes the one first contact 30 positioned at the end in the arrangement direction, in other words, even if the hook portion 42*a* superposes the first-contact mounting groove 24, the strength of the first insulator 20 can be maintained because the width of the hook portion 42*a* is small. As a result, the sturdiness of the connector 10 improves.

The second base portion 43*a* of each first metal fitting 40*a* extends in the longitudinal direction of the connector 10 from the engagement projection 22 to the corresponding second metal fitting 40*b*. This improves the sturdiness of the first metal fitting 40*a* in the longitudinal direction of the connector 10. Consequently, this improves the sturdiness of the engagement projection 22 extending in the longitudinal direction of the connector 10.

The first mount portions 44*b* of the second metal fitting 40*b* are also disposed respectively at both sides of the first metal fitting 40*a* in the transverse direction of the connector 10. The second mount portions 49*b* of the second metal fitting 40*b* are disposed respectively at both sides of the first metal fitting 40*a* in the transverse direction of the connector 10. This structure increases the mounting strength of the second metal fitting 40*b* mounted on the circuit substrate CB1. This improves the sturdiness of the second metal fitting 40*b* in the right-left direction.

A pair of the first mount portions 44*b* are disposed substantially at the same position as the mount portion 45*a* in the right-left direction. Accordingly, three mount portions are aligned along an imaginary line extending in the front-rear direction. This increases the mounting strength of the connector 10 mounted on the circuit substrate CB1. Even if the connection object 50 and the connector 10 engage each other in a misaligned state in which the connection object 50 is, for example, rotated relative to the connector 10 by a certain degree about an axis extending in the up-down direction, the connector 10 remains to be mounted on the circuit substrate CB1. Similarly, even if the circuit substrate CB1 having the connector 10 mounted thereon is rotated after the engagement, the connector 10 remains to be mounted on the circuit substrate CB1. Accordingly, the sturdiness of the connector 10 mounted on the circuit substrate CB1 improves.

Each second metal fitting 40*b* includes the elastically deformable contact arms 48*b* that come into contact with the corresponding metal fitting 80 in the engagement state. The contact arms 48*b*, which exert elastic forces to the metal fitting 80, can reliably maintain the state of connection with the metal fitting 80. Accordingly, the electrical continuity can be maintained reliably between the second metal fitting 40*b* and the metal fitting 80 in the engagement state.

The first metal fitting 40*a* and the second metal fitting 40*b*, which are spaced from each other, oppose each other in the right-left direction, and the metal fitting 80 of the connection object 50 is positioned between the first metal fitting 40*a* and the second metal fitting 40*b* in the engagement state in which the connector 10 and the connection object 50 engage each other. The structure in which the metal fitting 80 is interposed between the first metal fitting 40*a* and the second metal fitting 40*b* in the engagement state reduces the likelihood of the connector module 1 loosening after the engagement. As a result, the dimensional accuracy and the shape integrity of the connector 10 can be maintained during the engagement. The positioning function of the connector 10 and the connection object 50 relative to each other can be maintained even after the engagement. As a result, the connector 10 and the connection object 50 do not come off easily from each other, which improves the product reliability of the connector module 1.

The first metal fitting 40*a* and the first insulator 20 are formed integrally using insert molding, which increases the holding strength of the first insulator 20 holding the first metal fitting 40*a*. This further improves the sturdiness of the first metal fitting 40*a* and the engagement projection 22.

Those skilled in the art can obviously implement the present disclosure in a form other than the above-described embodiment without departing from the spirit or the essential features of the present disclosure. As such, the above description is only illustrative and should not be construed as limiting. The scope of the disclosure is not limited by the above description but by the appended claims. Variations that fall within the scope of the claim or the equivalents thereof are to be included in the present disclosure.

For example, the shapes, arrangements, and orientations of elements as well as the number of elements are not limited to what is disclosed in the above description and in the drawings. The shapes, arrangements, and orientations of elements as well as the number of elements may be changed arbitrarily insofar as the specified functions can be implemented.

In the above description of the embodiment, the installation portions 45*b* of each second metal fitting 40*b* are embedded integrally in the first insulator 20 using insert molding. In the connector 10, however, the second metal fitting 40*b* may be attached to the first insulator 20, for example, using press-fitting rather than insert molding. For example, in the connector 10, each first metal fitting 40*a* may be attached to the first insulator 20 by press-fitting rather than by insert molding.

In the above description of the embodiment, the first insulator 20 includes a pair of the outer walls 23 that are disposed at respective positions on the first insulator 20 in the front-rear direction. The first insulator 20, however, may include a single outer wall 23 formed only on one side of the first insulator 20 in the front-rear direction.

In the above description of the embodiment, only the second metal fitting 40*b* is present in each region R, and the first insulator 20 is not formed in the region R. In each region R, however, an arbitrary portion of the first insulator 20 excluding the outer wall 23 can be formed. For example, the bottom plate 21 may protrude into the region R, and the protruded portion may be surrounded by the peripheral portion 40*b*1 of the second metal fitting 40*b* in the region R. This improves the electrical insulation between the second metal fitting 40*b* and the circuit substrate CB1.

In the above description of the embodiment, the second metal fitting 40*b* includes the peripheral portion 40*b*1 in the region R, and the peripheral portion 40*b*1 constitutes part of the periphery of the connector 10. In the region R, the second metal fitting 40*b*, however, may additionally include a bottom portion that is formed so as to be continuous to, or attached to, the bottom plate 21 of the first insulator 20.

In the above description of the embodiment, only the outer peripheral surface 47*b*2 is formed continuously on the peripheral portion 40*b*1 from one of the installation portions 45*b* to the other. The inner peripheral surface 47*b*1, however, may be formed continuously on the peripheral portion 40*b*1 from one of the installation portions 45*b* to the other in addition to, or in place of, the outer peripheral surface 47*b*2.

In the peripheral portion 40*b*1, at least one of the outer peripheral surface 47*b*2 and the inner peripheral surface 47*b*1 does not need to be formed continuously from one of the installation portions 45*b* to the other. The peripheral portion 40*b*1 may be formed using an arbitrary method other than the metal drawing so as to have an arbitrary shape in which, for example, a slit or a hole is formed at a corner.

In the above description of the embodiment, the peripheral portion 40*b*1 has the dual-wall structure extending along peripheral sides of the connector 10 in the region R. The peripheral portion 40*b*1, however, may have an arbitrary structure, other than the dual-wall structure, extending along the peripheral sides of the connector 10 in the region R. For example, the peripheral portion 40*b*1 may have a single-wall structure or a triple-wall structure.

In the case of the peripheral portion 40*b*1 having the single-wall structure, the engagement between the second metal fitting 40*b* and the metal fitting 80 may be achieved by a structure using a protrusion and a recess rather than by the structure using the contact arms 48*b* having the spring elasticity. For example, a protrusion formed on the inner peripheral surface 47*b*1 of the second metal fitting 40*b* may engage a recess formed at the outer surface of the metal fitting 80 to achieve the engagement between the second metal fitting 40*b* and the metal fitting 80.

In the above description of the embodiment, a single first metal fitting 40*a* is disposed at each end of the engagement projection 22 in the right-left direction. The first metal fitting 40*a*, however, may be made of a pair of members that are spaced from each other and are disposed so as to serve as the first end portion 41*a*1 and the second end portion 41*a*2, respectively. In other words, the first metal fitting 40*a* consists of multiple members.

In the above description of the embodiment, the first metal fitting 40*a* includes the first projected portion 41*a*3 and the second projected portion 41*a*4. The first metal fitting 40*a*, however, may include only one of the first projected portion 41*a*3 and the second projected portion 41*a*4 or may include neither of these.

In the above description of the embodiment, the first metal fitting 40*a* includes the third projected portion 41*a*5 and the fourth projected portion 41*a*6. The first metal fitting 40*a*, however, may include only one of the third projected portion 41*a*5 and the fourth projected portion 41*a*6 or may include neither of these.

In the above description of the embodiment, the first metal fitting 40*a* includes the fifth projected portion 41*a*7. The first metal fitting 40*a*, however, does not need to include the fifth projected portion 41*a*7.

In the above description of the embodiment, the first metal fitting 40*a* includes the first flat surface S1, the second flat surface S2, the third flat surface S3, and the fourth flat surface S4. The first metal fitting 40*a*, however, may include at least one of the first flat surface S1, the second flat surface S2, the third flat surface S3, and the fourth flat surface S4, or may include neither of these. At least one of the first flat surface S1, the second flat surface S2, the third flat surface S3, and the fourth flat surface S4 of the first metal fitting 40*a* may be a curved surface.

In the above description of the embodiment, the first metal fitting 40*a* seamlessly covers the first face 221, the second face 222, the third face 223, and the fourth face 224, as well as all the intersection lines therebetween, with surfaces of the first metal fitting 40*a*, the surfaces orthogonally intersecting the thickness direction of the first metal fitting 40*a*, in the longitudinal end portion of the engagement projection 22. The first metal fitting 40*a* may be formed so as to have an arbitrary shape using an arbitrary method other than the metal drawing insofar as the first metal fitting 40*a* includes the first end portion 41*a*1 and the second end portion 41*a*2.

Figure 13:
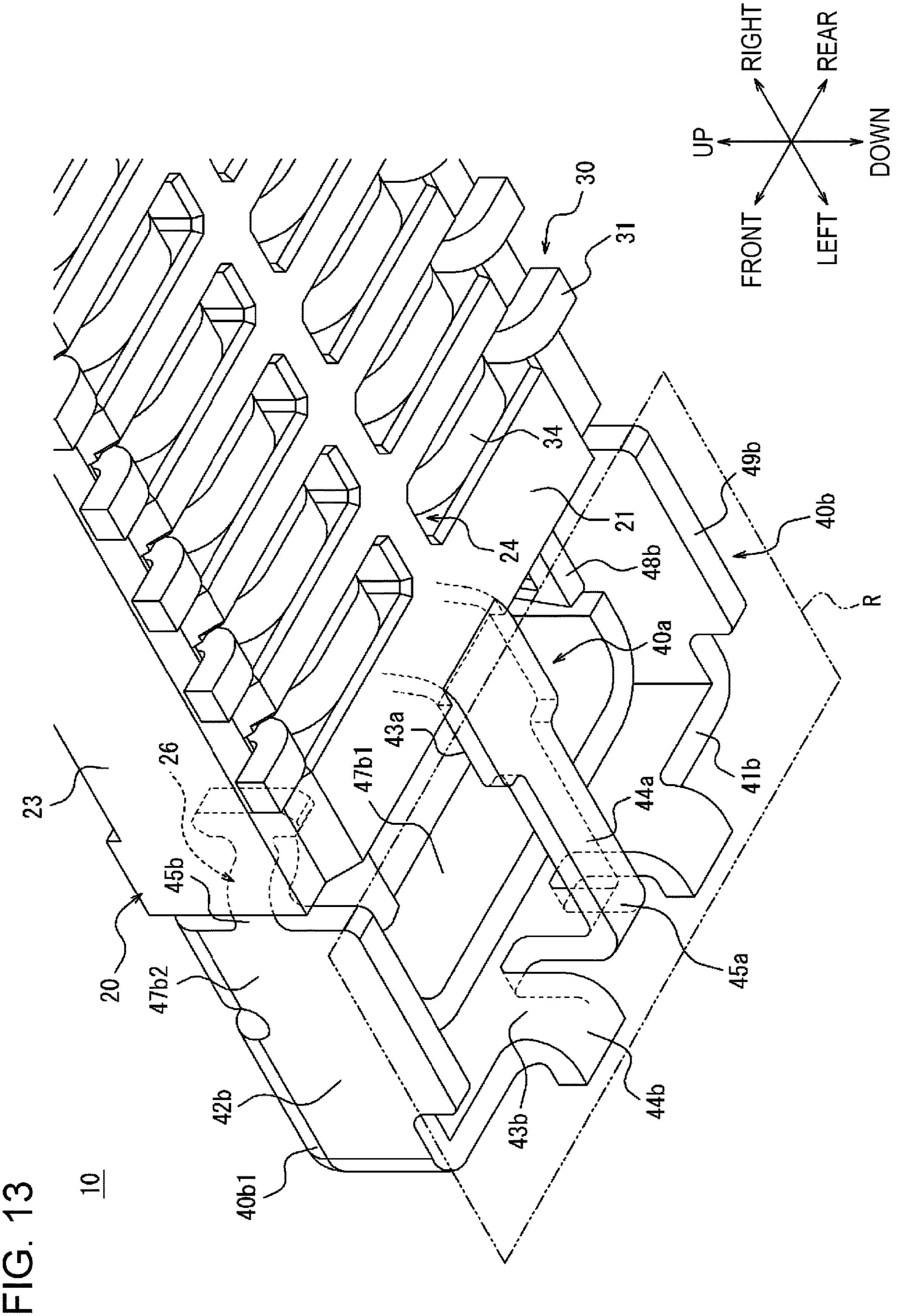
FIG. 13 is an enlarged view, as viewed from below, illustrating a connector according to an alternative embodiment, the view corresponding to the view of FIG. 8.

FIG. 13 is an enlarged view, as viewed from below, illustrating the connector 10 according to an alternative embodiment, the view corresponding to the view of FIG. 8. In the above description of the embodiment, the first metal fitting 40*a* and the second metal fitting 40*b* are separated from each other. However, the first metal fitting 40*a* and the second metal fitting 40*b* do not need to be separated but may be connected. In this case, the first metal fitting 40*a* and the second metal fitting 40*b* may be formed integrally but may have different strengths in a one-piece metal fitting. For example, the one-piece metal fitting in which the first metal fitting 40*a* and the second metal fitting 40*b* are integrated may be made of a functionally graded material. More specifically, the material of the portion of the first metal fitting 40*a* may be different from the material of the portion of the second metal fitting 40*b* so as to have a greater strength. For example, the one-piece metal fitting in which the first metal fitting 40*a* and the second metal fitting 40*b* are integrated may be formed so as to have different thicknesses. More specifically, the thickness of the portion of the first metal fitting 40*a* may be greater than that of the portion of the second metal fittings 40*b*.

The one-piece metal fitting, in which the first metal fitting 40*a* and the second metal fitting 40*b* are integrated, is embedded integrally in the first insulator 20 using insert molding at two portions, in other words, at the first-metal-fitting holding portion 25 and at the second-metal-fitting holding portions 26. Consequently, this increases the holding strength of the first insulator 20 holding the one-piece metal fitting. In the case of the first metal fitting 40*a* and the second metal fitting 40*b* being separate members, however, the first metal fitting 40*a* and the second metal fitting 40*b* are easier to manufacture. For example, press forming becomes easier compared with the case in which the first metal fitting 40*a* is shaped by drawing and subsequently joined to the second metal fitting 40*b*.

In the above description of the embodiment, the connector 10 includes the first metal fittings 40*a* attached to the engagement projection 22. The connector 10, however, does not need to include such metal fittings to be attached to the engagement projection 22.

In the above description of the embodiment, the strength of the first metal fitting 40*a* is greater than the strength of the second metal fitting 40*b*. The strength of the second metal fitting 40*b*, however, may be greater than that of the first metal fitting 40*a*.

In the above description of the embodiment, the thickness of the first metal fitting 40*a* is greater than the thickness of the second metal fitting 40*b* in order to increase the strength of the first metal fitting 40*a* relative to the strength of the second metal fitting 40*b*. For example, the thickness of the first metal fitting 40*a* may be smaller than that of the second metal fitting 40*b*, and the strength of the first metal fitting 40*a* may be greater than that of the second metal fitting 40*b*. On the contrary, the thickness of the first metal fitting 40*a* may be greater than that of the second metal fitting 40*b*, and the strength of the first metal fitting 40*a* may be smaller than that of the second metal fitting 40*b*.

In the above description of the embodiment, each first metal fitting 40*a* superposes the one first contact 30 in the arrangement direction. The first metal fitting 40*a*, however, does not need to superpose the one first contact 30 in the arrangement direction if the size reduction of the connector 10 in the longitudinal direction can be achieved using a different method.

In the above description of the embodiment, the tip end 42*a*1 of the hook portion 42*a* of each first metal fitting 40*a* is positioned between the one first contact 30 and the adjacent first contact 30 in the arrangement direction. However, the tip end 42*a*1 of the hook portion 42*a* of the first metal fitting 40*a* may be disposed, in the right-left direction, at a position corresponding to the position at which, for example, a first contact 30 is attached to the first insulator 20, insofar as the holding strength of the first insulator 20 holding the tip end 42*a*1 of the hook portion 42*a* can be maintained.

In the above description of the embodiment, the hook portion 42*a* is shaped like the letter L, and the tip end 42*a*1 of the hook portion 42*a* is embedded in the engagement projection 22. The hook portion 42*a*, however, may have any shape other than the shape like the letter L insofar as the holding strength of the first insulator 20 holding the hook portion 42*a* can be maintained. In addition, the tip end 42*a*1 of the hook portion 42*a* does not need to be embedded in the engagement projection 22.

In the above description of the embodiment, the width of the hook portion 42*a* is smaller than the width of any other portion of the first metal fitting 40*a* in the transverse direction of the connector 10. The hook portion 42*a*, however, may have the same width as that of any other portion of the first metal fitting 40*a* insofar as the strength of the first insulator 20 can be maintained.

In the above description of the embodiment, the second base portion 43*a* of the first metal fitting 40*a* extends from the engagement projection 22 to the corresponding second metal fitting 40*b*. The second base portion 43*a*, however, may extend by an arbitrary length from the engagement projection 22 toward the second metal fitting 40*b* insofar as the sturdiness of the first metal fitting 40*a* improves in the longitudinal direction of the connector 10.

In the above description of the embodiment, the mount portion 45*a* of the first metal fitting 40*a* is positioned directly below the first base portion 41*b* of the second metal fitting 40*b*. The mount portion 45*a*, however, may be disposed at a position near the engagement projection 22 so as to be closer to a portion of the first metal fitting 40*a* on which an external force is likely to act.

In the above description of the embodiment, the first mount portions 44*b* of the second metal fitting 40*b* are disposed respectively at both sides of the first metal fitting 40*a* in the transverse direction of the connector 10, and the second mount portions 49*b* of the second metal fitting 40*b* are also disposed respectively at both sides of the first metal fitting 40*a* in the transverse direction of the connector 10. However, either the first mount portions 44*b* or the second mount portions 49*b* may be disposed respectively at both sides of the first metal fitting 40*a* in the transverse direction of the connector 10. Only one first mount portion 44*b* or three or more first mount portions 44*b* may be provided rather than the two first mount portions 44*b*. Similarly, only one second mount portion 49*b* or three or more second mount portions 49*b* may be provided rather than the two second mount portions 49*b*.

In the above description of the embodiment, the second metal fitting 40*b* does not include any mount portion on the side of the inner peripheral surface 47*b*1. The second metal fitting 40*b*, however, may include a mount portion on the side of the inner peripheral surface 47*b*1. For example, the second metal fitting 40*b* may include a pair of third mount portions that are formed on the side of the inner peripheral surface 47*b*1 so as to oppose the corresponding first mount portions 44*b* formed on the side of the outer peripheral surface 47*b*2. This increases the mounting strength of the second metal fitting 40*b* mounted on the circuit substrate CB1. This further improves the sturdiness of the second metal fitting 40*b* and the connector 10.

In the above description of the embodiment, each second metal fitting 40*b* includes the elastically deformable contact arms 48*b* that come into contact with the metal fitting 80 of the connection object 50 in the engagement state. The second metal fitting 40*b*, however, may come into contact with the metal fitting 80 without deforming elastically. Moreover, the second metal fitting 40*b* does not need to come into contact with the metal fitting 80.

In the above description of the embodiment, the first face 221, the second face 222, the third face 223, and the fourth face 224 of the engagement projection 22 of the first insulator 20 are all flat faces. However, the first face 221, the second face 222, the third face 223, and the fourth face 224 may be curved. The first intersection line L1, the second intersection line L2, the third intersection line L3, the fourth intersection line L4, and the fifth intersection line L5 may be curved lines instead of the straight lines. The first intersection portion R1 and the second intersection portion R2 are not limited to angular corner portions, each including one intersecting point at which three planes intersect. The first intersection portion R1 and the second intersection portion R2 may be shaped as rounded corner portions.

In the above description of the embodiment, the metal fittings 80 of the connection object 50 are attached to respective transverse walls 62*a* of the second insulator 60. Each metal fitting 80 of the connection object 50, however, may include a portion integrally embedded in the second insulator 60, and the remaining peripheral portion of the metal fitting 80 may serve as part of the periphery of the connection object 50 as is the case for the second metal fitting 40*b* of the connector 10. The peripheral portion of each metal fitting 80 may solely constitute part of the periphery of the connection object 50 in a region located at each longitudinal end of the connection object 50 and also located outside of the corresponding longitudinal end portion of the second insulator 60. The second insulator 60 does not need to be present in this region.

The connector module 1, the connector 10, and the connection object 50 described above are mounted in an electronic apparatus that includes the circuit substrate CB1 and the circuit substrate CB2. For example, the type of electronic apparatus may be any communication terminal equipment, such as a smartphone, and any information processing equipment, such as a personal computer, a copier, a printer, a facsimile, or a multifunction printer. For example, the type of electronic apparatus may be any onboard equipment, such as a camera, a radar, a car digital video recorder, or an engine control unit. For example, the type of electronic apparatus may be any other onboard equipment to be used in an onboard system, such as a car navigation system, an advanced driver-assistance system, or a security system. Moreover, the type of electronic apparatus may be any arbitrary industrial equipment.

According to the above electronic apparatus, the occurrence of malfunction of the connector 10 caused by the first insulator 20 can be reduced even if the size and height of the connector 10 are reduced. The sturdiness of the connector 10 is improved during and after the engagement between the connector 10 and the connection object 50 even if the size and height of the connector 10 are reduced. This improves the product reliability of the electronic apparatus.

REFERENCE SIGNS

1 connector module
10 connector
20 first insulator (insulator)
21 bottom plate
22 engagement projection
221 first face
222 second face
223 third face
224 fourth face
23 outer wall
24 first-contact mounting groove
25 first-metal-fitting holding portion
26 second-metal-fitting holding portion
30 first contact (contact)
31 mount portion
32 locking portion
33 curved portion
34 elastic contact arm
35 elastic contact point
36 contact point
40*a* first metal fitting
41*a* first base portion
41*a*1 first end portion
41*a*2 second end portion
41*a*3 first projected portion
41*a*4 second projected portion
41*a*5 third projected portion
41*a*6 fourth projected portion
41*a*7 fifth projected portion
42*a* hook portion
42*a*1 tip end
43*a* second base portion
44*a* narrow portion
45*a* mount portion
40*b* second metal fitting
40*b*1 peripheral portion
41*b* first base portion
42*b* second base portion
43*b* protruding portion
44*b* first mount portion
45*b* installation portion
46*b* curved portion
47*b*1 inner peripheral surface
47*b*2 outer peripheral surface
48*b* contact arm
49*b* second mount portion
50 connection object
60 second insulator
61 bottom plate
62 peripheral wall
62*a* transverse wall
62*b* longitudinal wall
63 engagement recess
64 second-contact holding portion
65 metal-fitting holding portion
70 second contact
71 mount portion
72 curved portion
73 contact point
80 metal fitting
81 base portion
82 first extension portion
83 second extension portion
84 contact point
85 mount portion
E end portion
CB1 circuit substrate (first circuit substrate)
CB2 circuit substrate (second circuit substrate)
L1 first intersection line
L2 second intersection line
L3 third intersection line
L4 fourth intersection line
L5 fifth intersection line
R region
R1 first intersection portion
R2 second intersection portion
S1 first flat surface
S2 second flat surface
S3 third flat surface
S4 fourth flat surface

The invention claimed is:

1. A connector configured to engage a connection object, the connector comprising:

contacts;

an insulator comprising:

a pair of outer walls to which the contacts are attached, the pair of outer walls extending in a longitudinal direction of the connector; and an engagement projection disposed between the pair of outer walls and projecting toward an engagement side at which the connector and the connection object engage each other;

a first metal fitting attached to the engagement projection, the first metal fitting comprising a second base portion extending in the longitudinal direction of the connector and a mount portion to be mounted onto a circuit substrate; and a second metal fitting attached to a longitudinal-end portion of the outer wall, wherein the second metal fitting comprises a peripheral portion that serves as a periphery of the connector in a region located at a longitudinal end of the connector and located longitudinally outside of the longitudinal-end portion of the outer wall.

2. The connector according to claim 1, wherein only the second metal fitting is present in the region.

3. The connector according to claim 1, wherein the periphery of the connector comprises the second metal fitting in the region.

4. The connector according to claim 1, wherein the insulator comprises a bottom plate extending from the outer wall in a direction orthogonal to an engaging direction in which the connector and the connection object engage each other.

5. The connector according to claim 1, wherein the second metal fitting comprises a pair of installation portions attached to the longitudinal-end portion of the outer wall, the installation portions being spaced from each other in a transverse direction of the connector, and wherein at least one of an outer peripheral surface and an inner peripheral surface of the peripheral portion is located from one of the installation portions to the other installation portion so as to extend in the longitudinal direction from the one of the installation portions, bend and further extend in the transverse direction, and bend again and extend in the longitudinal direction to the other installation portion.

6. The connector according to claim 1, wherein the peripheral portion comprises a dual-wall structure extending along peripheral sides of the connector in the region.

7. The connector according to claim 1, wherein the second metal fitting and the insulator are formed integrally using insert molding.

8. The connector according to claim 1, wherein the second metal fitting comprises first mount portions arranged in the transverse direction of the connector and second mount portions arranged in the longitudinal direction of the connector.

9. The connector according to claim 1, wherein the mount portion comprises a bottom surface of the second base portion, the bottom surface positioned so as to face the circuit substrate.

10. The connector according to claim 9, wherein at least either the first mount portions or the second mount portions of the second metal fitting are disposed respectively at both sides of the first metal fitting in the transverse direction of the connector.

11. The connector according to claim 9, wherein the first metal fitting and the insulator are formed integrally using insert molding.

12. The connector according claim 1, wherein the connector is configured to be mounted on a first circuit substrate and to be connected to the connection object mounted on a second circuit substrate.

13. An electronic apparatus comprising:

the connector according to claim 1.

* * * * *